US00RE49789E

(19) United States
(12) Reissued Patent
Xu et al.

(10) Patent Number: US RE49,789 E
(45) Date of Reissued Patent: Jan. 2, 2024

(54) OPTICAL IMAGING LENS ASSEMBLY

(71) Applicant: Zhejiang Sunny Optical Co., Ltd, Ningbo (CN)

(72) Inventors: Biao Xu, Ningbo (CN); Kaiyuan Zhang, Ningbo (CN); Jianke Wenren, Ningbo (CN)

(73) Assignee: Zhejiang Sunny Optical Co., Ltd, Ningbo (CN)

(21) Appl. No.: 17/572,393

(22) Filed: Jan. 10, 2022

Related U.S. Patent Documents

Reissue of:
(64) Patent No.: 10,942,334
Issued: Mar. 9, 2021
Appl. No.: 16/227,008
Filed: Dec. 20, 2018

U.S. Applications:
(63) Continuation of application No. PCT/CN2018/095835, filed on Jul. 16, 2018.

(30) Foreign Application Priority Data

Oct. 26, 2017 (CN) ..... 201711012647.6
Oct. 26, 2017 (CN) ..... 201721402226.X

(51) Int. Cl.
*G02B 9/64* (2006.01)
*G02B 13/00* (2006.01)
(Continued)

(52) U.S. Cl.
CPC ..... *H04N 23/55* (2023.01); *G02B 9/64* (2013.01); *G02B 13/0045* (2013.01); *G02B 27/0025* (2013.01)

(58) Field of Classification Search
CPC ..... H04N 23/55; G02B 27/0025; G02B 13/0045; G02B 9/64
See application file for complete search history.

(56) References Cited

U.S. PATENT DOCUMENTS 9,116,329 B2 * 8/2015 Fukaya ..... G02B 27/0025
9,638,896 B2 * 5/2017 Fukaya ..... G02B 13/0045
(Continued)

FOREIGN PATENT DOCUMENTS

CN 103529539 A 1/2014
CN 203606556 U 5/2014
(Continued)

OTHER PUBLICATIONS

Hecht, Eugene. Optics, Fourth Edition, Addison Wesley, San Francisco, CA, USA, 2002, pp. 243-246. (Year: 2002).*
(Continued)

*Primary Examiner* — Christina Y. Leung
(74) *Attorney, Agent, or Firm* — Sughrue Mion, PLLC

(57) ABSTRACT

The present disclosure discloses an optical imaging lens assembly. The optical imaging lens assembly includes, sequentially from an object side to an image side along an optical axis, a first lens, a second lens, a third lens, a fourth lens, a fifth lens, a sixth lens, and a seventh lens. The first lens has a positive refractive power and a convex object-side surface. The second lens has a negative refractive power. The third lens has a positive refractive power. Each of the fourth lens and the fifth lens has a positive refractive power or a negative refractive power. The sixth lens has a positive refractive power. The seventh lens has a negative refractive power, a concave object-side surface and a concave image-side surface. A combined focal length f12 of the first and second lenses and a combined focal length f34 of the third and fourth lenses satisfy:$|f12/f34| \leq 0.3$.

18 Claims, 18 Drawing Sheets

(51) Int. Cl.

| | |
|---|---|
| ***G02B 27/00*** | (2006.01) |
| ***H04N 5/225*** | (2006.01) |
| ***H04N 23/55*** | (2023.01) |

(56) References Cited

U.S. PATENT DOCUMENTS

| | | | | |
|---|---|---|---|---|
| 10,133,036 | B1 * | 11/2018 | Wang | G02B 9/64 |
| 10,330,895 | B2 * | 6/2019 | Shi | G02B 1/041 |
| 2014/0139719 | A1 * | 5/2014 | Fukaya | G02B 27/0025 348/340 |
| 2015/0226941 | A1 * | 8/2015 | Fukaya | G02B 9/64 359/708 |
| 2016/0124191 | A1 | 5/2016 | Hashimoto | |
| 2016/0341937 | A1 * | 11/2016 | Tsai | G02B 13/18 |
| 2017/0082834 | A1 | 3/2017 | Tang et al. | |
| 2017/0082835 | A1 | 3/2017 | Tang et al. | |
| 2017/0176723 | A1 * | 6/2017 | Fukaya | G02B 13/0045 |
| 2018/0188483 | A1 | 7/2018 | Hsieh et al. | |
| 2018/0188499 | A1 | 7/2018 | Hashimoto | |
| 2018/0246299 | A1 * | 8/2018 | Fukaya | G02B 27/0025 |
| 2018/0246301 | A1 * | 8/2018 | Fukaya | G02B 13/0045 |
| 2018/0267275 | A1 * | 9/2018 | Fukaya | G02B 9/64 |
| 2019/0004285 | A1 * | 1/2019 | Tang | G02B 13/0045 |
| 2021/0048623 | A1 * | 2/2021 | Dai | G02B 9/64 |

FOREIGN PATENT DOCUMENTS

| | | | |
|---|---|---|---|
| CN | 203941337 | U | 11/2014 |
| CN | 204065539 | U | 12/2014 |
| CN | 104570280 | A | 4/2015 |
| CN | 104597582 | A | 5/2015 |
| CN | 105116519 | A | 12/2015 |
| CN | 204832662 | U | 12/2015 |
| CN | 105445907 | A | 3/2016 |
| CN | 106483629 | A | 3/2017 |
| CN | 106950681 | A | 7/2017 |
| CN | 107621683 | A | 1/2018 |
| CN | 207301467 | U | 5/2018 |
| JP | 2015-225246 | A | 12/2015 |

OTHER PUBLICATIONS

"F-number." (1992) In C. G. Morris (Ed.), Academic Press Dictionary of Science and Technology, 4th ed., Oxford, UK: Elsevier Science & Technology. (Year: 1992).*

"Focal power." (1992) In C. G. Morris (Ed.), Academic Press Dictionary of Science and Technology, 4th ed., Oxford, UK: Elsevier Science & Technology (Year: 1992).*

Greivenkamp, John E. Field Guide to Geometrical Optics, SPIE Press, Bellingham, WA, USA, 2004, p. 7. (Year: 2004).*

* cited by examiner

OPTICAL IMAGING LENS ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This is a continuation of International Application PCT/CN2018/095835, with an international filing date of Jul. 16, 2018, which claims the priorities and rights to Chinese Patent Application No. 201711012647.6 and Chinese Patent Application No. 201721402226.X filed with the China National Intellectual Property Administration (CNIPA) on Oct. 26, 2017, the disclosures of which are hereby incorporated by reference in their entireties.

TECHNICAL FIELD

The present disclosure relates to an optical imaging lens assembly, and more specifically to an optical imaging lens assembly including seven lenses.

BACKGROUND

With the improvement in performance and reduction in size of the commonly used photosensitive elements such as charge-coupled devices (CCD) or complementary metal-oxide semiconductor elements (CMOS), the number of pixels of the photosensitive elements is increased and the size of the pixels is reduced. Accordingly, higher requirements on high imaging quality and miniaturization of the counterpart optical imaging lens assemblies have been brought forward.

The reduction in pixel size means that the amount of light passing through the lens may become less during the same exposure time. However, in the condition of a dim environment (e.g., cloudy and rainy days, or at dusk), the lens assembly needs to have a large amount of light passing through to ensure the imaging quality. A general configuration for an existing lens assembly includes an F-number Fno (total effective focal length of the lens assembly/entrance pupil diameter of the lens assembly) of 2.0 or above. Although this type of lens assembly can fulfill the miniaturization requirement, the imaging quality of the lens assembly cannot be ensured in a situation with insufficient light. Therefore, the lens assembly having the F-number Fno of 2.0 or above can no longer fulfill the higher-order imaging requirements.

SUMMARY

The present disclosure provides an optical imaging lens assembly which may be applicable to portable electronic products and may at least or partially sovle at least one of the above disadvantages in the existing technology, for example, an imaging lens assembly having a large aperture.

According to an aspect, the present disclosure provides an optical imaging lens assembly. The optical imaging lens assembly includes, sequentially from an object side to an image side along an optical axis, a first lens, a second lens, a third lens, a fourth lens, a fifth lens, a sixth lens, and a seventh lens. The first lens may have a positive refractive power, and an object-side surface of the first lens may be a convex surface. The second lens may have a negative refractive power. The third lens may have a positive refractive power. Each of the fourth lens and the fifth lens has a positive refractive power or a negative refractive power. The sixth lens may have a positive refractive power. The seventh lens may have a negative refractive power, and an object-side surface and an image-side surface of the seventh lens may both be concave surfaces. A combined focal length f12 of the first lens and the second lens and a combined focal length f34 of the third lens and the fourth lens may satisfy: $|f12/f34| \leq 0.3$.

In an embodiment, a total effective focal length f of the optical imaging lens assembly and an entrance pupil diameter EPD of the optical imaging lens assembly may satisfy: $f/EPD \leq 1.80$.

In an embodiment, the total effective focal length f of the optical imaging lens assembly and an effective focal length f7 of the seventh lens may satisfy: $-2.5 < f/f7 < -1.5$.

In an embodiment, an effective focal length f2 of the second lens and the effective focal length f7 of the seventh lens may satisfy: $4.5 < f2/f7 < 11.0$.

In an embodiment, an effective focal length f6 of the sixth lens and the effective focal length f7 of the seventh lens may satisfy: $-1.5 < f6/f7 < -1.0$.

In an embodiment, the effective focal length f7 of the seventh lens and a radius of curvature R14 of the image-side surface of the seventh lens may satisfy: $-1.5 < f7/R14 < -1.0$.

In an embodiment, an effective focal length f1 of the first lens and a radius of curvature R1 of the object-side surface of the first lens may satisfy: $2.0 < f1/R1 < 3.0$.

In an embodiment, a center thickness CT1 of the first lens on the optical axis and the effective focal length f2 of the second lens may satisfy: $-0.2 < CT1/f2 < 0$.

In an embodiment, the effective focal length f6 of the sixth lens and an effective focal length f3 of the third lens may satisfy: $0 < f6/f3 < 0.5$.

In an embodiment, the radius of curvature R1 of the object-side surface of the first lens and a radius of curvature R4 of an image-side surface of the second lens may satisfy: $0 < R1/R4 < 1$.

In an embodiment, a radius of curvature R12 of an image-side surface of the sixth lens and the radius of curvature R14 of the image-side surface of the seventh lens may satisfy: $-1.5 < R12/R14 < -0.5$.

In an embodiment, a center thickness CT6 of the sixth lens on the optical axis may satisfy: 0.3 mm<CT6<0.8 mm.

In an embodiment, a total track length TTL of the optical imaging lens assembly and half of a diagonal length ImgH of an effective pixel area on an image plane of the optical imaging lens assembly may satisfy: $TTL/ImgH \leq 1.50$.

According to another aspect, the present disclosure provides an optical imaging lens assembly. The optical imaging lens assembly includes, sequentially from an object side to an image side along an optical axis, a first lens, a second lens, a third lens, a fourth lens, a fifth lens, a sixth lens, and a seventh lens. The first lens may have a positive refractive power, an object-side surface of the first lens may be a convex surface, and an image-side surface of the first lens may be a concave surface. The second lens may have a negative refractive power. The third lens may have a positive refractive power. Each of the fourth lens and the fifth lens has a positive refractive power or a negative refractive power. The sixth lens may have a positive refractive power. The seventh lens may have a negative refractive power, and an object-side surface and an image-side surface of the seventh lens may both be concave surfaces. A total track length TTL of the optical imaging lens assembly and half of a diagonal length ImgH of an effective pixel area on an image plane of the optical imaging lens assembly may satisfy: TTL/ImgH≤1.50.

The present disclosure adopts a plurality of lenses (e.g., seven lenses). By reasonably distributing the refractive powers and the surface types of the lenses, the center thicknesses of the lenses, the spacing distances on the optical axis between the lenses, etc., the above optical imaging lens assembly has at least one of the beneficial effects such as ultra-thin, miniaturization, large aperture, and high imaging quality.

BRIEF DESCRIPTION OF THE DRAWINGS

By describing non-limiting embodiments below in detail and in combination with the accompanying drawings, other features, objectives and advantages of the present disclosure will be more apparent. In the accompanying drawings.

DETAILED DESCRIPTION

Figure 1:
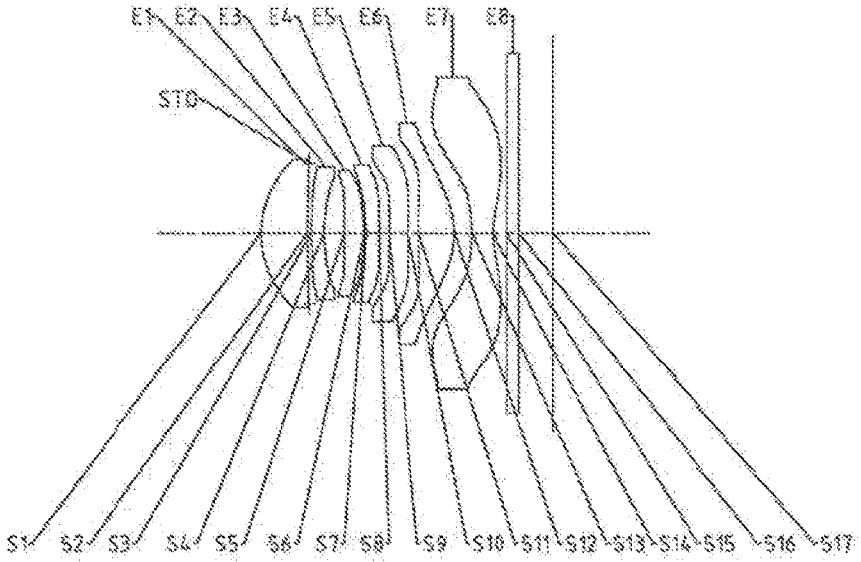
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary embodiments of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the embodiments of the present disclosure, relates to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The optical imaging lens assembly according to exemplary embodiments of the present disclosure may include, for example, seven lenses (i.e., a first lens, a second lens, a third lens, a fourth lens, a fifth lens, a sixth lens, and a seventh lens) having refractive powers. The seven lenses are arranged in sequence from an object side to an image side along an optical axis.

In the exemplary embodiments, the first lens may have a positive refractive power. An object-side surface of the first lens may be a convex surface. The second lens may have a negative refractive power. The third lens may have a positive refractive power. The fourth lens has a positive refractive power or a negative refractive power. The fifth lens has a positive refractive power or a negative refractive power. The sixth lens may have a positive refractive power. The seventh lens may have a negative refractive power. An object-side surface of the seventh lens may be a concave surface, and an image-side surface of the seventh lens may be a concave surface.

In the exemplary embodiments, an image-side surface of the first lens may be a concave surface.

In the exemplary embodiments, an object-side surface of the second lens may be a convex surface, and an image-side surface of the second lens may be a concave surface.

In the exemplary embodiments, an object-side surface of the third lens may be a convex surface.

In the exemplary embodiments, an object-side surface of the sixth lens may be a convex surface, and an image-side surface of the sixth lens may be a convex surface.

In the exemplary embodiments, the optical imaging lens assembly of the present disclosure may satisfy the conditional expression $f/EPD \leq 1.80$. Here, f is the total effective focal length of the optical imaging lens assembly, and EPD is the entrance pupil diameter of the optical imaging lens assembly. More specifically, f and EPD may further satisfy: $1.58 \leq f/EPD \leq 1.76$. The smaller the F-number Fno (i.e., the total effective focal length f of the lens assembly/the entrance pupil diameter EPD of the lens assembly) of the optical imaging lens assembly is, the larger the clear aperture of the lens assembly is, and the greater the amount of light entering the lens assembly in the same unit time is. The reduction of the F-number Fno may effectively enhance the brightness of the image plane, so that the lens assembly can better fulfill the shooting requirements when the light is insufficient (e.g., in cloudy and rainy days, or at dusk), and thus the lens assembly has the advantage of large aperture. When the lens assembly is configured to satisfy the conditional expression $f/EPD \leq 1.60$, the lens assembly may have the advantage of the large aperture. Thus, the amount of light passing through the system may be increased, thereby enhancing the illuminance of the image plane. At the same time, the aberration of the edge field-of-view may also be reduced.

In the exemplary embodiments, the optical imaging lens assembly of the present disclosure may satisfy the conditional expression $|f12/f34| \leq 0.3$. Here, f12 is the combined focal length of the first lens and the second lens, and f34 is the combined focal length of the third lens and the fourth lens. More specifically, f12 and f34 may further satisfy: $0.061 \leq |f12/f34| \leq 0.28$. Reasonably distributing f12 and f34 is conductive to improving the optical performance of the imaging system.

In the exemplary embodiments, the optical imaging lens assembly of the present disclosure may satisfy the conditional expression $4.5 < f2/f7 < 11.0$. Here, f2 is the effective focal length of the second lens, and f7 is the effective focal length of the seventh lens. More specifically, f2 and f7 may further satisfy: $4.94 \leq f2/f7 \leq 10.02$. By reasonably distributing the effective focal length of the second lens and the effective focal length of the seventh lens, the deflection angle of light may be reduced, thereby improving the imaging quality of the optical system.

In the exemplary embodiments, the optical imaging lens assembly of the present disclosure may satisfy the conditional expression $0 < R1/R4 < 1$. Here, R1 is the radius of curvature of the object-side surface of the first lens, and R4 is the radius of curvature of the image-side surface of the second lens. More specifically, R1 and R4 may further satisfy: $0.35 < R1/R4 < 0.65$, for example, $0.40 \leq R1/R4 \leq 0.63$. The range of the ratio of the radius of curvature R1 of the object-side surface of the first lens to the radius of curvature R4 of the image-side surface of the second lens is reasonably controlled, which facilitates the system achieving the deflection of the optical path well.

In the exemplary embodiments, the optical imaging lens assembly of the present disclosure may satisfy the conditional expression $-1.5 < R12/R14 < -0.5$. Here, R12 is the radius of curvature of the image-side surface of the sixth lens, and R14 is the radius of curvature of the image-side surface of the seventh lens. More specifically, R12 and R14 may further satisfy: $-1.1<R12/R14<-0.8$, for example, $-1.08\leq R12/R14\leq -0.88$. By reasonably controlling the ratio of R12 to R14, the aberration of the system can be easily balanced, thereby improving the imaging quality of the imaging system.

In the exemplary embodiments, the optical imaging lens assembly of the present disclosure may satisfy the conditional expression $TTL/ImgH\leq 1.50$. Here, TTL is the total track length of the optical imaging lensassembly (i.e., the distance from the center of the object-side surface of the first lens to the image plane of the optical imaging lens assembly on the optical axis), and ImgH is the half of the diagonal length of the effective pixel area on the image plane. More specifically, TTL and ImgH may further satisfy: $1.40\leq TTL/ImgH\leq 1.48$. When the conditional expression $TTL/ImgH\leq 1.50$ is satisfied, the size of the system may be effectively compressed, which ensures the ultra-thin characteristic of the imaging lens assembly.

In the exemplary embodiments, the optical imaging lens assembly of the present disclosure may satisfy the conditional expression $-2.5<f/f7<-1.5$. Here, f is the total effective focal length of the optical imaging lens assembly and f7 is the effective focal length of the seventh lens. More specifically, f and f7 may further satisfy: $-2.1<f/f7<-1.8$, for example, $-2.07\leq f/f7\leq -1.98$. By controlling the negative refractive power of the seventh lens within a reasonable range, the positive astigmatism in a reasonable range may be obtained, which can balance the negative astigmatism generated by the six lenses (i.e., the lenses between the object side and the seventh lens) before the seventh lens, so that the imaging system can obtain a good imaging quality.

In the exemplary embodiments, the optical imaging lens assembly of the present disclosure may satisfy the conditional expression 0.3 mm<CT6<0.8 mm. Here, CT6 is the center thickness of the sixth lens on the optical axis. More specifically, CT6 may further satisfy: 0.4 mm<CT6<0.7 mm, for example, 0.46 mm≤CT6≤0.61 mm. By properly controlling the center thickness CT6 of the sixth lens, the optical element may be ensured to have a good processing characteristic. At the same time, the total track length TTL of the lens assembly may be ensured to be kept within a certain reasonable range.

In the exemplary embodiments, the optical imaging lens assembly of the present disclosure may satisfy the conditional expression $2.0<f1/R1<3.0$. Here, f1 is the effective focal length of the first lens, and R1 is the radius of curvature of the object-side surface of the first lens. More specifically, f1 and R1 may further satisfy: $2.1<f1/R1<2.6$, for example, $2.20\leq f1/R1\leq 2.55$. By reasonably controlling the ratio of the effective focal length f1 of the first lens to the radius of curvature R1 of the object-side surface of the first lens, the deflection angle of the edge field-of-view at the first lens can be effectively controlled, and thus the sensitivity of the system can be effectively reduced.

In the exemplary embodiments, the optical imaging lens assembly of the present disclosure may satisfy the conditional expression $-0.2<CT1/f2<0$. Here, CT1 is the center thickness of the first lens on the optical axis, and f2 is the effective focal length of the second lens. More specifically, CT1 and f2 may further satisfy: $-0.1<CT1/f2<0$, for example, $-0.08\leq CT1/f2<-0.04$. Reasonably controlling the ratio of CT1 to f2 is conductive to ensuring the processing characteristic of the first lens and the spherical aberration contribution of the second lens. Thus, the imaging system has a good imaging quality in the on-axis field-of-view area.

In the exemplary embodiments, the optical imaging lens assembly of the present disclosure may satisfy the conditional expression $-1.5<f6/f7<-1.0$. Here, f6 is the effective focal length of the sixth lens, and f7 is the effective focal length of the seventh lens. More specifically, f6 and f7 may further satisfy: $-1.44\leq f6/f7\leq -1.08$. By reasonably controlling the ratio of the effective focal length of the sixth lens to the effective focal length of the seventh lens, the residual spherical aberrations obtained after the balance between the sixth lens and the seventh lens can be balanced with the spherical aberrations generated by the five lenses (i.e., the lenses between the object side and the sixth lens) before the sixth lens. Thus, the fine adjustment on the spherical aberration of the system is realized, and the effect of reducing the aberration in the on-axis field-of-view area is achieved.

In the exemplary embodiments, the optical imaging lens assembly of the present disclosure may satisfy the conditional expression $-1.5<f7/R14<-1.0$. Here, f7 is the effective focal length of the seventh lens, and R14 is the radius of curvature of the image-side surface of the seventh lens. More specifically, f7 and R14 may further satisfy: $-1.3<f7/R14<-1.1$, for example, $-1.28\leq f7/R14\leq -1.14$. By reasonably controlling the radius of curvature of the image-side surface of the seventh lens, the third-order comatic aberration of the seventh lens is controlled within a reasonable range. Thus, the comatic aberrations generated by the six lenses before the seventh lens can be balanced, so that the imaging system has a good imaging quality.

In the exemplary embodiments, the optical imaging lens assembly of the present disclosure may satisfy the conditional expression $0<f6/f3<0.5$. Here, f6 is the effective focal length of the sixth lens, and f3 is the effective focal length of the third lens. More specifically, f6 and f3 may further satisfy: $0.1<f6/f3<0.4$, for example, $0.11\leq f6/f3\leq 0.38$. By reasonably controlling the ratio of f6 to f3, the spherical aberration contribution of the sixth lens and the spherical aberration contribution of the third lens can be reasonably controlled, so that the imaging system has a good imaging quality in the on-axis field-of view area.

In the exemplary embodiments, the optical imaging lens assembly may further include at least one diaphragm, to further improve the imaging quality of the lens assembly. For example, the diaphragm may be disposed between the first lens and the second lens.

Alternatively, the optical imaging lens assembly may further include an optical filter for correcting color deviations and/or a protective glass for protecting a photosensitive element on the image plane.

The optical imaging lens assembly according to the above embodiments of the present disclosure may use a plurality of lenses, for example, the seven lenses described above. By reasonably distributing the refractive powers and the surface types of the lenses, the center thicknesses of the lenses, the spacing distances between the lenses on the axis, etc., it is possible to effectively reduce the size of the lens assembly, reduce the sensitivity of the lens assembly, and enhance the processibility of the lens assembly, so that the optical imaging lens assembly is more conductive to the production and processing and applicable to the portable electronic products. At the same time, the optical imaging lens assembly with the above configuration also has beneficial effects such as ultra-thin, miniaturization, large aperture, and high imaging quality.

In the embodiments of the present disclosure, at least one of the surfaces of the lenses is an aspheric surface. The aspheric lens is characterized in that the curvature continuously changes from the center of the lens to the periphery.

Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the embodiments, the optical imaging lens assembly is not limited to include seven lenses. If desired, the optical imaging lens assembly may also include other numbers of lenses.

Specific embodiments of the optical imaging lens assembly that may be applied to the above embodiments are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 1 shows the surface type, the radius of curvature, the thickness, the material and the conic coefficient of each lens of the optical imaging lens assembly in Embodiment 1. The radius of curvature and the thickness are both in millimeters (mm).

TABLE 1

| surface number | surface type | radius of curvature | thickness | material: refractive index | material: abbe number | conic coefficient |
|---|---|---|---|---|---|---|
| OBJ | spherical | infinite | infinite | | | |
| S1 | aspheric | 1.6825 | 0.7887 | 1.55 | 56.1 | 0.0128 |
| S2 | aspheric | 8.3068 | 0.0328 | | | 3.8896 |
| STO | spherical | infinite | 0.0350 | | | |
| S3 | aspheric | 4.6640 | 0.2172 | 1.67 | 20.4 | −7.9131 |
| S4 | aspheric | 2.6839 | 0.3484 | | | −1.7896 |
| S5 | aspheric | 24.2341 | 0.3401 | 1.55 | 56.1 | 25.7166 |
| S6 | aspheric | −3.5372 | 0.0300 | | | 7.3000 |
| S7 | aspheric | −3.5773 | 0.2177 | 1.55 | 56.1 | 5.6401 |
| S8 | aspheric | 41.7512 | 0.1745 | | | −99.0000 |
| S9 | aspheric | 12.0879 | 0.3352 | 1.67 | 20.4 | 46.2401 |
| S10 | aspheric | 5.1346 | 0.1816 | | | −79.5381 |
| S11 | aspheric | 7.3861 | 0.6069 | 1.55 | 56.1 | −97.8337 |
| S12 | aspheric | −1.3762 | 0.3036 | | | −8.4969 |
| S13 | aspheric | −3.7331 | 0.3500 | 1.54 | 55.7 | −2.2333 |
| S14 | aspheric | 1.5688 | 0.2340 | | | −9.6678 |
| S15 | spherical | infinite | 0.2103 | 1.52 | 64.2 | |
| S16 | spherical | infinite | 0.5740 | | | |
| S17 | spherical | infinite | | | | |

As may be obtained from Table 1, the object-side surface and the image-side surface of any lens among the first to seventh lenses E1-E7 are both aspheric surfaces. In this embodiment, the surface type x of each aspheric surface may be defined using, but not limited to, the following formula:

$$x = \frac{ch^2}{1+\sqrt{1-(k+1)c^2h^2}} + \sum Aih^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S1-S14 in Embodiment 1.

TABLE 2

| surface number | A4 | A6 | A8 | A10 | A12 | A14 | A16 | A18 | A20 |
|---|---|---|---|---|---|---|---|---|---|
| S1 | −9.6100E − 03 | 6.4354E − 02 | −2.2752E − 01 | 4.9383E − 01 | −6.8363E − 01 | 6.0365E − 01 | −3.2970E − 01 | 1.0100E − 01 | −1.3360E − 02 |
| S2 | −9.9670E − 02 | 1.1211E − 01 | 1.8602E − 01 | −9.7186E − 01 | 1.8102E + 00 | −1.9196E + 00 | 1.2028E + 00 | −4.1341E − 01 | 5.9939E − 02 |
| S3 | −1.7887E − 01 | 3.4329E − 01 | −4.8103E − 01 | 7.4328E − 01 | −1.1333E + 00 | 1.2693E + 00 | −8.7261E − 01 | 3.2940E − 01 | −5.2440E − 02 |
| S4 | −7.8170E − 02 | −2.1530E − 02 | 1.1801E − 00 | −5.0751E + 00 | 1.2193E + 01 | −1.7899E + 01 | 1.5876E + 01 | −7.7921E + 00 | 1.6308E + 00 |
| S5 | −7.9840E − 02 | 1.3189E − 01 | −8.5200E − 01 | 2.4292E + 00 | −4.5264E + 00 | 5.3997E + 00 | −4.0601E + 00 | 1.8226E + 00 | −3.8096E − 01 |
| S6 | 3.5613E − 02 | −2.0127E − 01 | 9.6660E − 01 | −3.4935E + 00 | 7.4444E + 00 | −9.4690E + 00 | 7.0676E + 00 | −2.8355E + 00 | 4.6899E − 01 |
| S7 | −3.6800E − 03 | 7.6484E − 02 | −4.3323E − 01 | 1.1785E + 00 | −2.0201E + 00 | 2.4372E + 00 | −2.0035E + 00 | 9.5575E − 01 | −1.8947E − 01 |
| S8 | −1.2773E − 01 | 1.1835E − 01 | −2.2444E − 01 | 3.0869E − 02 | 5.4935E − 01 | −1.0628E + 00 | 9.8617E − 01 | −4.7910E − 01 | 9.7996E − 02 |
| S9 | −2.2027E − 01 | 2.3157E − 01 | −5.0670E − 01 | 8.9234E − 01 | −1.2931E + 00 | 1.1957E + 00 | −5.7771E − 01 | 1.1223E − 01 | −8.3000E − 04 |
| S10 | −1.7177E − 01 | 1.9157E − 01 | −4.6011E − 01 | 8.6283E − 01 | −1.0810E + 00 | 8.3132E − 01 | −3.6968E − 01 | 8.7028E − 02 | −8.9300E − 03 |
| S11 | −5.0510E − 02 | 3.6812E − 02 | −2.3171E − 01 | 4.8139E − 01 | −5.2615E − 01 | 3.3309E − 01 | −1.2318E − 01 | 2.4682E − 02 | −2.0600E − 03 |
| S12 | −1.5094E − 01 | 2.5511E − 01 | −4.2149E − 01 | 4.4916E − 01 | −2.8015E − 01 | 1.0389E − 01 | −2.2650E − 02 | 2.6860E − 03 | −1.3000E − 04 |
| S13 | −1.3929E − 01 | 1.5506E − 02 | 2.9978E − 02 | −1.1730E − 02 | 1.1160E − 03 | 2.5100E − 04 | −7.6000E − 05 | 7.6500E − 06 | −2.8000E − 07 |
| S14 | −1.1865E − 01 | 7.1242E − 02 | −3.3840E − 02 | 1.1731E − 02 | −2.9400E − 03 | 5.1200E − 04 | −5.9000E − 05 | 3.9700E − 06 | −1.2000E − 07 |

Table 3 shows the effective focal lengths f1-f7 of the respective lenses in Embodiment 1, the total effective focal length f of the optical imaging lens assembly, the total track length TTL (i.e., the distance from the center of the object-side surface S1 of the first lens E1 to the image plane S17 on the optical axis) of the optical imaging lens assembly, and the half of the diagonal length ImgH of the effective pixel area on the image plane S17 of the optical imaging lens assembly.

TABLE 3

| | | | |
|---|---|---|---|
| f1(mm) | 3.71 | f(mm) | 4.00 |
| f2(mm) | −9.93 | TTL(mm) | 4.98 |
| f3(mm) | 5.68 | ImgH(mm) | 3.36 |
| f4(mm) | −6.03 | | |
| f5(mm) | −13.67 | | |
| f6(mm) | 2.18 | | |
| f7(mm) | −2.01 | | |

The optical imaging lens assembly in Embodiment 1 satisfies at least one of the following conditions.

f/EPD=1.58, here f is the total effective focal length of the optical imaging lens assembly, and EPD is the entrance pupil diameter of the optical imaging lens assembly.

|f12/f34|=0.06, here f12 is the combined focal length of the first lens E1 and the second lens E2, and f34 is the combined focal length of the third lens E3 and the fourth lens E4.

f2/f7=4.94, here f2 is the effective focal length of the second lens E2, and f7 is the effective focal length of the seventh lens E7.

R1/R4=0.63, here R1 is the radius of curvature of the object-side surface S1 of the first lens E1, and R4 is the radius of curvature of the image-side surface S4 of the second lens E2.

R12/R14=−0.88, here R12 is the radius of curvature of the image-side surface S12 of the sixth lens E6, and R14 is the radius of curvature of the image-side surface S14 of the seventh lens E7.

TTL/ImgH=1.48, here TTL is the total track length of the optical imaging lens assembly, and ImgH is the half of the diagonal length of the effective pixel area on the image plane S17.

f/f7=−1.99, here f is the total effective focal length of the optical imaging lens assembly, and f7 is the effective focal length of the seventh lens E7.

CT6=0.61 mm, here CT6 is the center thickness of the sixth lens E6 on the optical axis.

f1/R1=2.20, here f1 is the effective focal length of the first lens E1, and R1 is the radius of curvature of the object-side surface S1 of the first lens E1.

CT1/f2=−0.08, here CT1 is the center thickness of the first lens E1 on the optical axis, and f2 is the effective focal length of the second lens E2.

f6/f7=−1.08, here f6 is the effective focal length of the sixth lens E6, and f7 is the effective focal length of the seventh lens E7.

f7/R14=1.28, here f7 is the effective focal length of the seventh lens E7, and R14 is the radius of curvature of the image-side surface S14 of the seventh lens E7.

f6/f3=0.38, here f6 is the effective focal length of the sixth lens E6, and f3 is the effective focal length of the third lens E3.

Figure 2A:
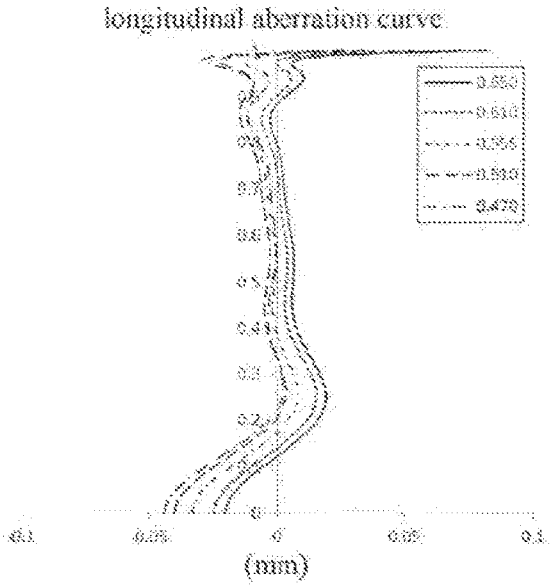
FIGS. 2A-2D respectively illustrate a longitudinal aberration curve, an astigmatic curve, a distortion curve, and a lateral color curve of the optical imaging lens assembly according to Embodiment 1.
Figure 2B:
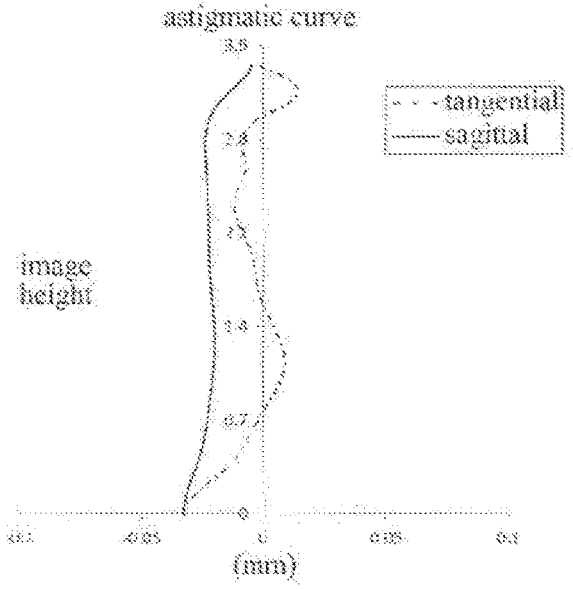
Figure 2C:
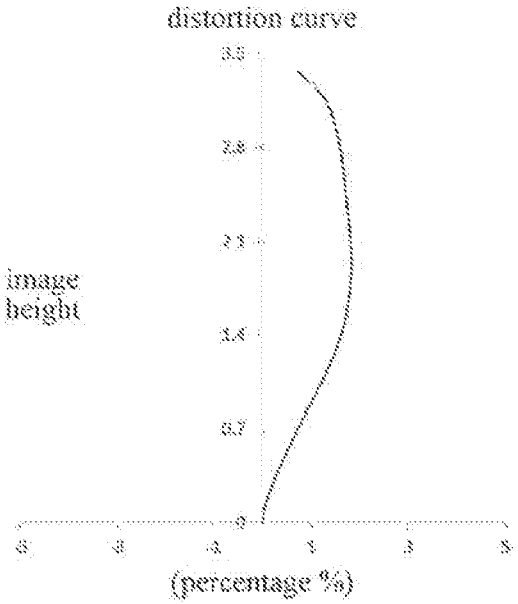
Figure 2D:
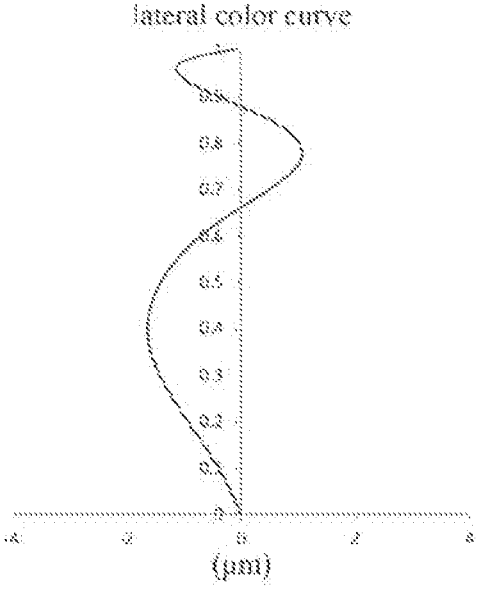

In addition, FIG. 2A illustrates the longitudinal aberration curve of the optical imaging lens assembly according to Embodiment 1, representing deviations of focal points of light of different wavelengths converged after passing through the lens assembly. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the lens assembly. It can be seen from FIGS. 2A-2D that the optical imaging lens assembly according to Embodiment 1 can achieve a good imaging quality.

Embodiment 2

Figure 3:
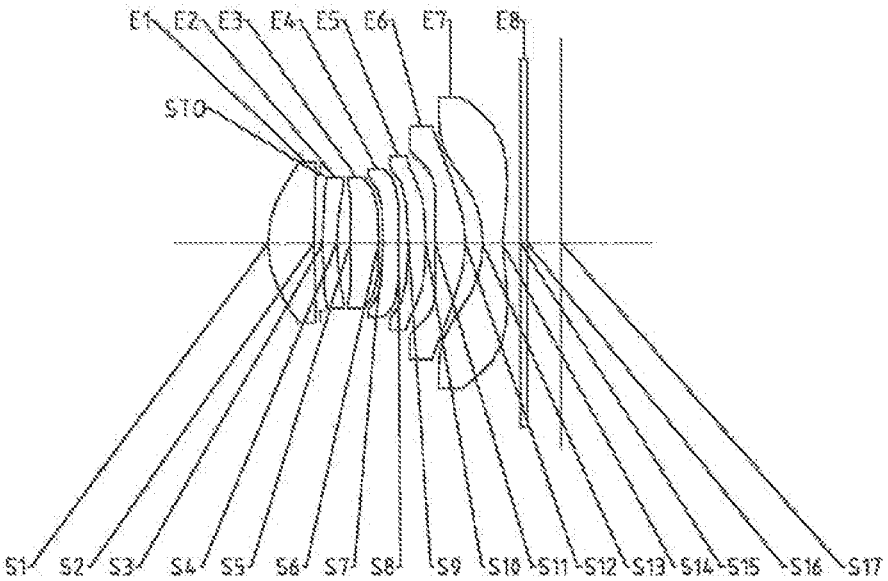
FIG. 3 is a schematic structural diagram illustrating an optical imaging lens assembly according to Embodiment 2 of the present disclosure.

An optical imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 4 shows the surface type, the radius of curvature, the thickness, the material and the conic coefficient of each lens of the optical imaging lens assembly in Embodiment 2. The radius of curvature and the thickness are both in millimeters (mm).

TABLE 4

| surface number | surface type | radius of curvature | thickness | material: refractive index | material: abbe number | conic coefficient |
|---|---|---|---|---|---|---|
| OBJ | spherical | infinite | infinite | | | |
| S1 | aspheric | 1.6934 | 0.7548 | 1.55 | 56.1 | −0.0460 |
| S2 | aspheric | 5.6686 | 0.1078 | | | −11.9183 |
| STO | spherical | infinite | 0.0400 | | | |
| S3 | aspheric | 5.4212 | 0.2300 | 1.67 | 20.4 | −18.2078 |
| S4 | aspheric | 3.5559 | 0.2183 | | | −6.5924 |
| S5 | aspheric | 10.4477 | 0.4711 | 1.55 | 56.1 | 61.8278 |
| S6 | aspheric | −15.2323 | 0.0700 | | | −80.7875 |
| S7 | aspheric | 45.6790 | 0.2525 | 1.67 | 20.4 | 99.0000 |
| S8 | aspheric | 9.8325 | 0.1640 | | | 42.6534 |
| S9 | aspheric | −14.4916 | 0.2831 | 1.67 | 20.4 | 99.0000 |
| S10 | aspheric | −15.4206 | 0.1586 | | | −73.8173 |
| S11 | aspheric | 9.8826 | 0.4951 | 1.55 | 56.1 | 37.8164 |
| S12 | aspheric | −1.6547 | 0.2791 | | | −9.9228 |
| S13 | aspheric | −2.8588 | 0.3262 | 1.54 | 55.7 | −1.4621 |
| S14 | aspheric | 1.6811 | 0.3033 | | | −16.1601 |
| S15 | spherical | infinite | 0.1100 | 1.52 | 64.2 | |
| S16 | spherical | infinite | 0.5561 | | | |
| S17 | spherical | infinite | | | | |

As may be obtained from Table 4, in Embodiment 2, the object-side surface and the image-side surface of any lens among the first to seventh lenses E1-E7 are both aspheric surfaces. Table 5 shows the high-order coefficients applicable to each aspheric surface in Embodiment 2. The surface type of each aspheric surface may be defined by the formula (1) given in Embodiment 1.

TABLE 5

| surface number | A4 | A6 | A8 | A10 | A12 | A14 | A16 | A18 | A20 |
|---|---|---|---|---|---|---|---|---|---|
| S1 | −2.5350E − 02 | 1.0145E − 01 | −3.1309E − 01 | 5.6998E − 01 | −6.6437E − 01 | 4.8971E − 01 | −2.2201E − 01 | 5.5676E − 02 | −5.8600E − 03 |
| S2 | −5.7620E − 02 | 5.0630E − 03 | 8.3859E − 02 | −2.1507E − 01 | 2.8456E − 01 | −2.3303E − 01 | 1.1650E − 01 | −3.2450E − 02 | 3.8530E − 03 |

TABLE 5-continued

| surface number | A4 | A6 | A8 | A10 | A12 | A14 | A16 | A18 | A20 |
|---|---|---|---|---|---|---|---|---|---|
| S3 | −1.2819E − 01 | −1.4773E − 01 | −2.2369E − 01 | 6.7720E − 01 | −1.3000E + 00 | 1.4322E + 00 | −8.7899E − 01 | 2.7052E − 01 | −2.9030E − 02 |
| S4 | −7.5860E − 02 | −2.7090E − 02 | 8.0357E − 01 | −3.4884E + 00 | 9.5854E + 00 | −1.6845E + 01 | 1.8140E + 01 | −1.0869E + 01 | 2.7806E + 00 |
| S5 | −7.1420E − 02 | 1.1944E − 01 | −8.0707E − 01 | 2.2062E + 00 | −3.4885E + 00 | 2.6573E + 00 | −1.0300E − 02 | −1.3225E + 00 | 6.1824E − 01 |
| S6 | −1.0921E − 01 | 3.5019E − 02 | −3.8527E − 01 | 1.0732E + 00 | −2.2377E + 00 | 3.0822E + 00 | −2.4136E + 00 | 9.4839E − 01 | −1.4123E − 01 |
| S7 | −2.5378E − 01 | 5.1600E − 01 | −1.8389E + 00 | 4.1775E + 00 | −6.5243E − 00 | 6.8301E + 00 | −4.3455E + 00 | 1.4329E + 00 | −1.7397E − 01 |
| S8 | −1.9886E − 01 | 2.4443E − 01 | −2.7913E − 01 | −7.2550E − 02 | 5.5365E − 01 | −6.7788E − 01 | 4.1268E − 01 | −1.3907E − 01 | 2.2527E − 02 |
| S9 | −1.7260E − 01 | 3.1883E − 01 | −7.9364E − 01 | 1.9253E + 00 | −3.5565E + 00 | 4.1007E + 00 | −2.7863E + 00 | 1.0264E + 00 | −1.5815E − 01 |
| S10 | −1.7197E − 01 | 4.5801E − 02 | 4.1281E − 02 | 4.2585E − 02 | −3.0715E − 01 | 3.9925E − 01 | −2.2613E − 01 | 6.0136E − 02 | −6.1600E − 03 |
| S11 | −1.4290E − 02 | −1.7641E − 01 | 1.5278E − 01 | 1.7267E − 01 | −5.6933E − 01 | 5.8103E − 01 | −3.0034E − 01 | 7.9629E − 02 | −8.5800E − 03 |
| S12 | −3.1100E − 03 | −7.8940E − 02 | 1.6942E − 01 | −1.7014E − 01 | 9.3437E − 02 | −2.9180E − 02 | 5.0730E − 03 | −4.4000E − 04 | 1.3200E − 05 |
| S13 | −2.8553E − 01 | 2.7594E − 01 | −2.1155E − 01 | 1.3942E − 01 | −6.1360E − 02 | 1.6676E − 02 | −2.7100E − 03 | 2.4200E − 04 | −9.2000E − 06 |
| S14 | −1.5178E − 01 | 1.2222E − 01 | −7.2300E − 02 | 2.8620E − 02 | 7.3000E − 03 | 1.0720E − 03 | −6.4000E − 05 | −2.9000E − 06 | 4.2600E − 07 |

Table 6 shows the effective focal lengths f1-f7 of the respective lenses in Embodiment 2, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 6

| | | | |
|---|---|---|---|
| f1(mm) | 4.15 | f(mm) | 3.88 |
| f2(mm) | −16.33 | TTL(mm) | 4.82 |
| f3(mm) | 11.43 | ImgH(mm) | 3.34 |
| f4(mm) | −18.87 | | |
| f5(mm) | −411.43 | | |
| f6(mm) | 2.64 | | |
| f7(mm) | −1.92 | | |

Figure 4A:
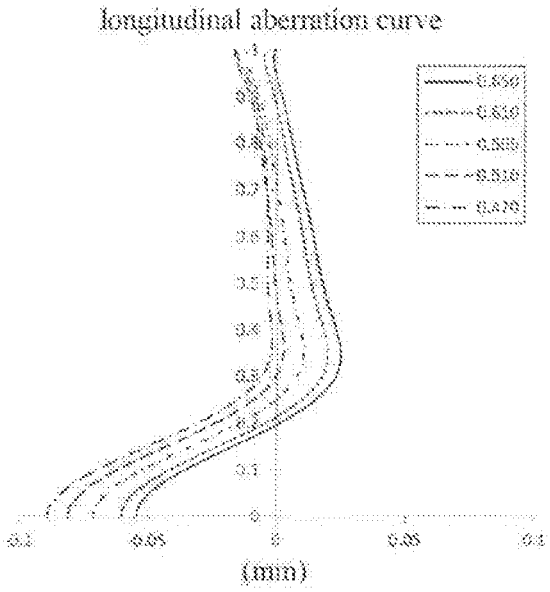
FIGS. 4A-4D respectively illustrate a longitudinal aberration curve, an astigmatic curve, a distortion curve, and a lateral color curve of the optical imaging lens assembly according to Embodiment 2.
Figure 4B:
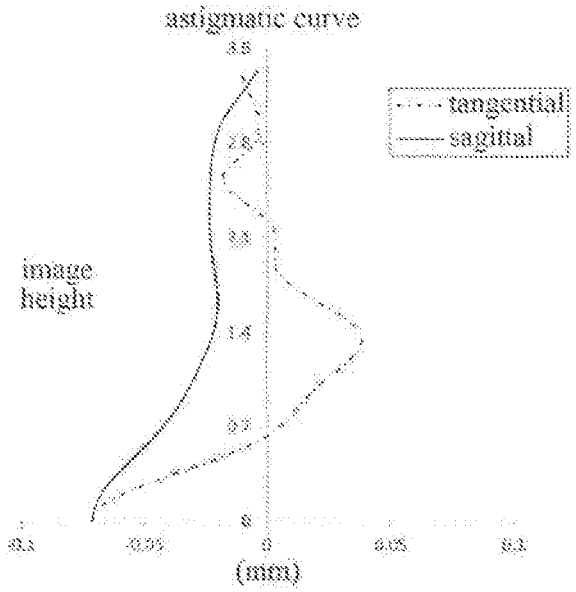
Figure 4C:
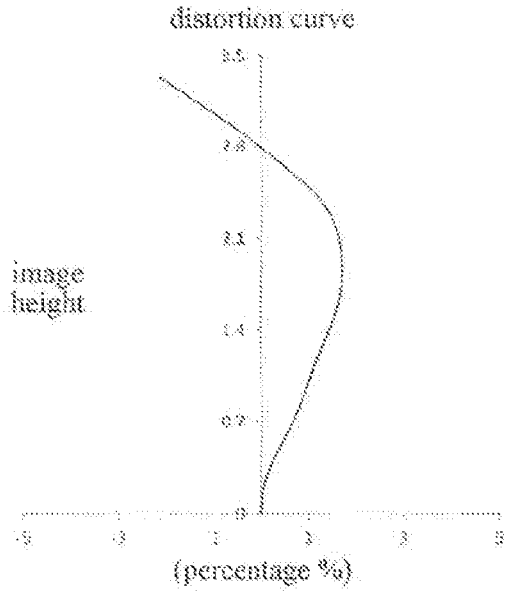
Figure 4D:
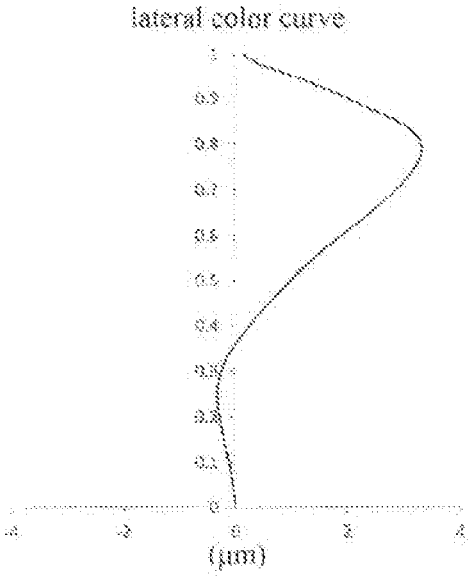

FIG. 4A illustrates the longitudinal aberration curve of the optical imaging lens assembly according to Embodiment 2, representing deviations of focal points of light of different wavelengths converged after passing through the lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the lens assembly. It can be seen from FIGS. 4A-4D that the optical imaging lens assembly according to Embodiment 2 can achieve a good imaging quality.

Embodiment 3

Figure 5:
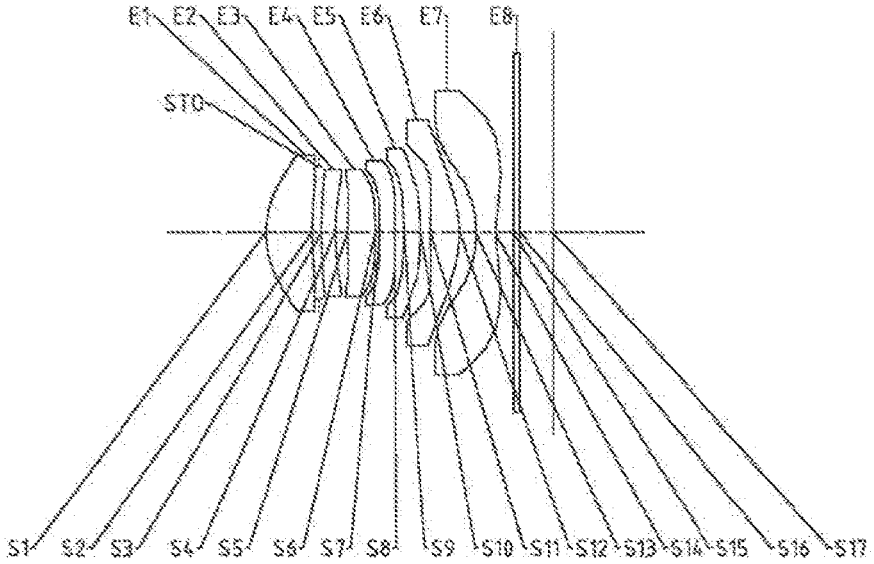
FIG. 5 is a schematic structural diagram illustrating an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 7 shows the surface type, the radius of curvature, the thickness, the material and the conic coefficient of each lens of the optical imaging lens assembly in Embodiment 3. The radius of curvature and the thickness are both in millimeters (mm).

TABLE 7

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.6801 | 0.7742 | 1.55 | 56.1 | −0.0224 |
| S2 | aspheric | 5.1923 | 0.1168 | | | −9.3561 |
| STO | spherical | infinite | 0.0400 | | | |
| S3 | aspheric | 5.6121 | 0.2300 | 1.67 | 20.4 | −25.5929 |
| S4 | aspheric | 3.6551 | 0.2044 | | | −8.1217 |
| S5 | aspheric | 9.3440 | 0.4689 | 1.55 | 56.1 | 59.8335 |
| S6 | aspheric | −17.7217 | 0.0700 | | | −89.5502 |
| S7 | aspheric | 28.5631 | 0.2505 | 1.67 | 2-0.4 | 34.2567 |
| S8 | aspheric | 8.5630 | 0.1561 | | | 38.8580 |
| S9 | aspheric | −20.0000 | 0.2892 | 1.67 | 20.4 | 81.6473 |
| S10 | aspheric | −19.8393 | 0.1719 | | | −99.0000 |
| S11 | aspheric | 9.1229 | 0.4878 | 1.55 | 56.1 | 32.4787 |
| S12 | aspheric | −1.6995 | 0.2707 | | | −10.2471 |
| S13 | aspheric | −3.0210 | 0.3178 | 1.54 | 55.7 | −1.4137 |
| S14 | aspheric | 1.6601 | 0.3045 | | | −15.2913 |
| S15 | spherical | infinite | 0.1100 | 1.52 | 64.2 | |
| S16 | spherical | infinite | 0.5573 | | | |
| S17 | spherical | infinite | | | | |

As may be obtained from Table 7, in Embodiment 3, the object-side surface and the image-side surface of any lens among the first to seventh lenses E1-E7 are both aspheric surfaces. Table 8 shows the high-order coefficients applicable to each aspheric surface in Embodiment 3. The surface type of each aspheric surface may be defined by the formula (1) given in Embodiment 1.

TABLE 9

| | | | |
|---|---|---|---|
| f1(mm) | 4.22 | f(mm) | 3.92 |
| f2(mm) | −16.52 | TTL(mm) | 4.82 |
| f3(mm) | 11.28 | ImgH(mm) | 3.34 |
| f4(mm) | −18.46 | | |
| f5(mm) | 2157.54 | | |

TABLE 8

| surface number | A4 | A6 | A8 | A10 | A12 | A14 | A16 | A18 | A20 |
|---|---|---|---|---|---|---|---|---|---|
| S1 | −2.5110E − 02 | 1.0818E − 01 | −3.0971E − 01 | 5.5640E − 01 | −6.3575E − 01 | 4.5669E − 01 | −1.9996E − 01 | 4.7892E − 02 | −4.7600E − 03 |
| S2 | −5.0320E − 02 | −6.4500E − 03 | 8.4655E − 02 | −1.9261E − 01 | 2.4587E − 01 | −1.9882E − 01 | 9.8900E − 02 | −2.7480E − 02 | 3.2560E − 03 |
| S3 | −1.2023E − 01 | 1.1884E − 01 | −2.0927E − 01 | 7.1792E − 01 | −1.3992E + 00 | 1.5598E + 00 | −9.9462E − 01 | 3.3538E − 01 | −4.4970E − 02 |
| S4 | −7.0790E − 02 | −6.8650E − 02 | 9.5569E − 01 | −4.0189E + 00 | 1.0873E + 01 | −1.8731E + 01 | 1.9715E + 01 | −1.1538E + 01 | 2.8850E + 00 |
| S5 | −5.9600E − 02 | 5.9986E − 02 | −6.2202E − 01 | 1.8806E + 00 | −3.4013E + 00 | 3.4044E + 00 | −1.4350E + 00 | −2.2399E − 01 | 2.9631E − 01 |
| S6 | −1.2867E − 01 | 2.1240E − 01 | −1.0013E + 00 | 2.1955E + 00 | −3.2117E + 00 | 3.0916E + 00 | −1.7060E + 00 | 4.1643E − 01 | −1.4020E − 02 |
| S7 | −2.6235E − 01 | 5.0293E − 01 | −1.4849E + 00 | 2.5300E + 00 | −2.5912E + 00 | 1.4054E + 00 | −8.6700E − 03 | −4.2226E − 01 | 1.5230E − 01 |
| S8 | −2.0817E − 01 | 2.8366E − 01 | −3.8914E − 01 | 8.0413E − 02 | 4.9164E − 01 | −7.4772E − 01 | 5.0053E − 01 | −1.7380E − 01 | 2.6967E − 02 |
| S9 | −1.3891E − 01 | 1.6107E − 01 | −2.6656E − 01 | 7.4229E − 01 | −1.8758E + 00 | 2.6417E + 00 | −2.0439E + 00 | 8.2287E − 01 | −1.3479E − 01 |
| S10 | −1.4675E − 01 | −3.4440E − 02 | 2.6558E − 01 | −4.0922E − 01 | 2.8134E − 01 | −7.3580E − 02 | −2.3500E − 03 | 3.1480E − 03 | −1.4000E − 04 |
| S11 | −3.9900E − 03 | −2.3724E − 01 | 3.4309E − 01 | −1.9006E − 01 | −1.4980E − 01 | 2.8339E − 01 | −1.7499E − 01 | 5.1120E − 02 | −5.9000E − 03 |
| S12 | 1.0208E − 02 | −1.0144E − 01 | 1.9555E − 01 | −1.8663E − 01 | 9.6083E − 02 | −2.6920E − 02 | 3.7640E − 03 | −1.7000E − 04 | −65.000E − 06 |
| S13 | −2.8510E − 01 | 2.7288E − 01 | −2.0701E − 01 | 1.3592E − 01 | −5.9610E − 02 | 1.6088E − 02 | −2.5800E − 03 | 2.2800E − 04 | −8.5000E − 06 |
| S14 | −1.5834E − 01 | 1.3546E − 01 | −8.7290E − 02 | 3.8896E 02 | −1.1770E − 02 | 2.3080E − 03 | −2.7000E − 04 | 1.6900E − 05 | −3.8000E − 07 |

Table 9 shows the effective focal lengths f1-f7 of the respective lenses in Embodiment 3, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 9-continued

| | |
|---|---|
| f6(mm) | 2.67 |
| f7(mm) | −1.95 |

Figure 6A:
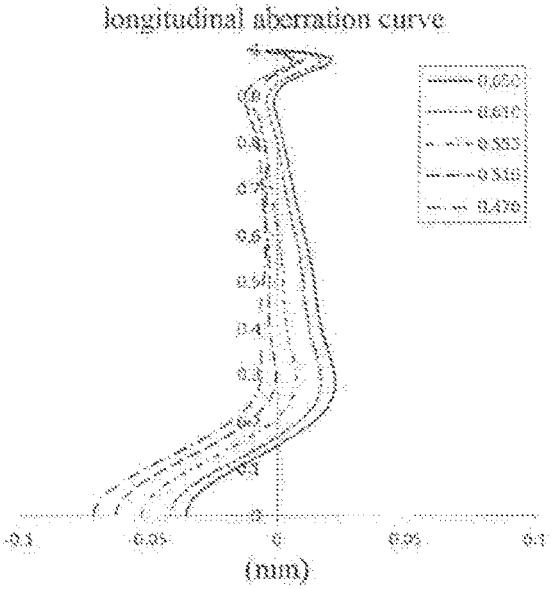
FIGS. 6A-6D respectively illustrate a longitudinal aberration curve, an astigmatic curve, a distortion curve, and a lateral color curve of the optical imaging lens assembly according to Embodiment 3.
Figure 6B:
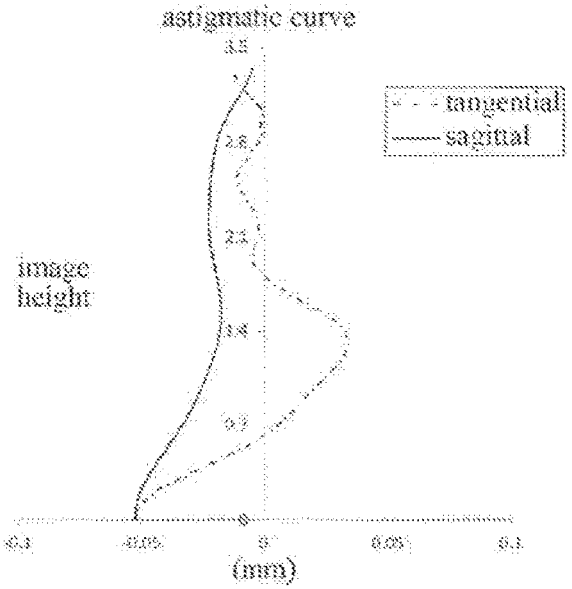
Figure 6C:
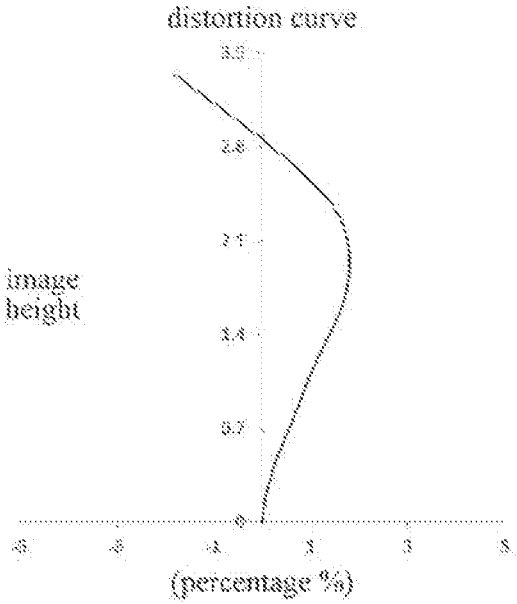
Figure 6D:
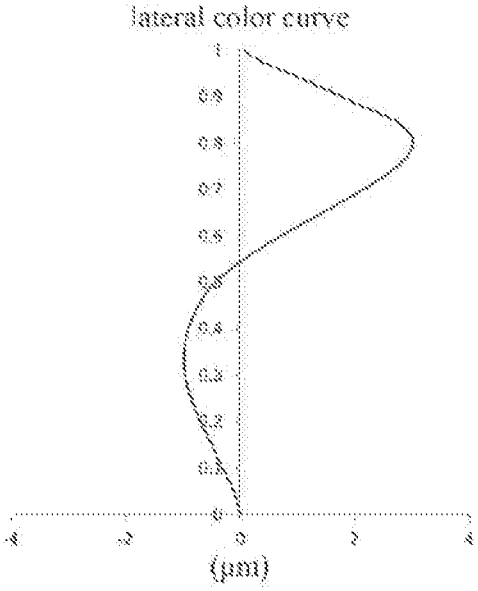

FIG. 6A illustrates the longitudinal aberration curve of the optical imaging lens assembly according to Embodiment 3, representing deviations of focal points of light of different wavelengths converged after passing through the lens assembly. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on the image plane after light passes through the lens assembly. It can be seen from FIGS. 6A-6D that the optical imaging lens assembly according to Embodiment 3 can achieve a good imaging quality.

Embodiment 4

Figure 7:
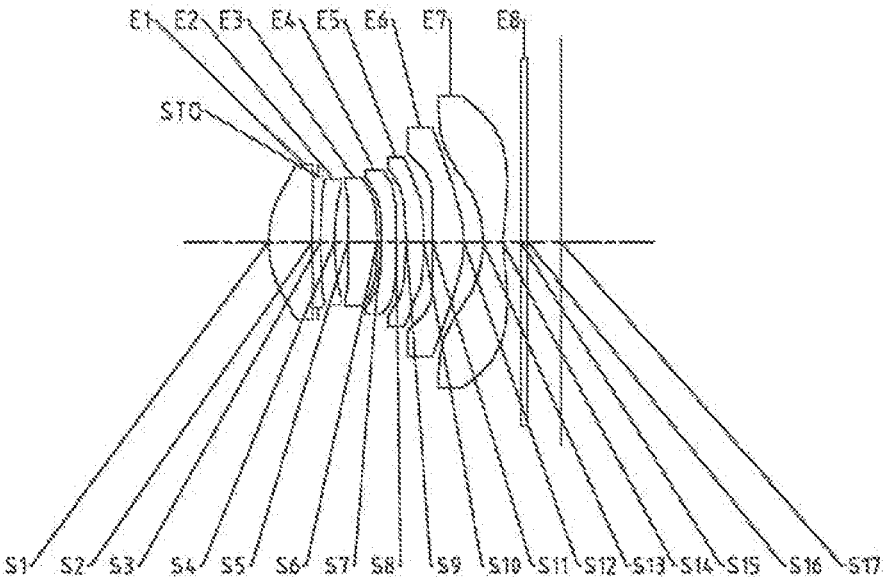
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 10 shows the surface type, the radius of curvature, the thickness, the material and the conic coefficient of each lens of the optical imaging lens assembly in Embodiment 4. The radius of curvature and the thickness are both in millimeters (mm).

TABLE 10

| surface number | surface type | radius of curvature | thickness | material: refractive index | material: abbe number | conic coefficient |
|---|---|---|---|---|---|---|
| OBJ | spherical | infinite | infinite | | | |
| S1 | aspheric | 1.6929 | 0.7193 | 1.55 | 56.1 | −0.0998 |
| S2 | aspheric | 6.2949 | 0.0984 | | | −16.2736 |
| STO | spherical | infinite | 0.0400 | | | |
| S3 | aspheric | 5.4549 | 0.2300 | 1.67 | 20.4 | −8.0637 |
| S4 | aspheric | 3.5446 | 0.2248 | | | −3.9727 |
| S5 | aspheric | 13.9387 | 0.4856 | 1.55 | 56.1 | 56.0398 |
| S6 | aspheric | −10.6543 | 0.0600 | | | 57.2530 |
| S7 | aspheric | −87.3703 | 0.2466 | 1.67 | 20.4 | −99.0000 |
| S8 | aspheric | 15.8550 | 0.1684 | | | 34.0353 |
| S9 | aspheric | −12.2494 | 0.2837 | 1.67 | 20.4 | 87.6792 |
| S10 | aspheric | −18.2539 | 0.1452 | | | 10.2729 |
| S11 | aspheric | 10.1481 | 0.5160 | 1.55 | 56.1 | 43.3042 |
| S12 | aspheric | −1.6827 | 0.3108 | | | −10.5698 |
| S13 | aspheric | −2.8863 | 0.3232 | 1.54 | 55.7 | −1.3827 |
| S14 | aspheric | 1.6674 | 0.3026 | | | −16.7588 |
| S15 | spherical | infinite | 0.1100 | 1.52 | 64.2 | |
| S16 | spherical | infinite | 0.5554 | | | |
| S17 | spherical | infinite | | | | |

As may be obtained from Table 10, in Embodiment 4, the object-side surface and the image-side surface of any lens among the first to seventh lenses E1-E7 are both aspheric surfaces. Table 11 shows the high-order coefficients applicable to each aspheric surface in Embodiment 4. The surface type of each aspheric surface may be defined by the formula (1) given in Embodiment 1.

TABLE 11

| surface number | A4 | A6 | A8 | A10 | A12 | A14 | A16 | A18 | A20 |
|---|---|---|---|---|---|---|---|---|---|
| S1 | −2.5890E − 02 | 1.0865E − 01 | −3.5138E − 01 | 6.7315E − 01 | −8.3500E − 01 | 6.5883E − 01 | −3.2197E − 01 | 8.7814E − 02 | −1.0140E − 02 |
| S2 | −6.2480E − 02 | 9.9910E − 03 | 9.0788E − 02 | −2.6462E − 01 | 3.8786E − 01 | −3.5028E − 01 | 1.9258E − 01 | −5.8840E − 02 | 7.6400E − 03 |
| S3 | −1.3177E − 01 | 1.6835E − 01 | −2.4957E − 01 | 7.2560E − 01 | −1.3738E + 00 | 1.4515E + 00 | −7.7477E − 01 | 1.4665E − 01 | 1.3634E − 02 |
| S4 | −7.5470E − 02 | −4.3040E − 02 | 1.0885E + 00 | −5.0563E + 00 | 1.4662E + 01 | −2.7060E + 01 | 3.0635E + 01 | −1.9343E + 01 | 5.2285E + 00 |
| S5 | −8.9620E − 02 | 2.4116E − 01 | −1.5112E + 00 | 4.7468E + 00 | −9.0751E + 00 | 1.0071E + 01 | −5.5574E + 00 | 5.9752E − 01 | 4.8979E − 01 |
| S6 | −1.1733E − 01 | −1.1623E − 01 | 7.0810E − 03 | 1.0801E + 00 | −4.2291E + 00 | 7.8223E + 00 | −7.6858E + 00 | 3.8581E + 00 | −7.8080E − 01 |
| S7 | −2.9272E − 01 | 7.5147E − 01 | −3.5448E + 00 | 1.0605E + 01 | −2.0599E + 01 | 2.5822E + 01 | −1.9902E + 01 | 8.4883E + 00 | −1.5242E + 00 |
| S8 | −1.8046E − 01 | 1.7187E − 01 | −8.1840E − 02 | −4.4769E − 01 | 1.0441E + 00 | −1.1093E + 00 | 6.3482E − 01 | −1.9095E − 01 | 2.5334E − 02 |
| S9 | −1.9603E − 01 | 3.6782E − 01 | −8.0634E − 01 | 1.6715E + 00 | −2.8911E + 00 | 3.2928E + 00 | −2.2697E + 00 | 8.6785E − 01 | −1.4164E − 01 |
| S10 | −1.9583E − 01 | 5.3010E − 02 | 1.2246E − 01 | −1.7709E − 01 | −4.9240E − 02 | 2.4633E − 01 | −1.8148E − 01 | 5.5222E − 02 | −6.2500E − 03 |
| S11 | −3.9140E − 02 | −9.1390E − 02 | −1.1181E − 01 | 7.026E − 01 | −1.2754E + 00 | 1.1743E + 00 | −5.9789E − 01 | 1.6068E − 01 | −1.7790E − 02 |
| S12 | −1.8100E − 02 | −3.1820E − 02 | 1.1872E − 01 | −1.6136E − 01 | 1.1427E − 01 | −4.6090E − 02 | 1.0739E − 02 | −1.3500E − 03 | 7.1700E − 05 |
| S13 | −2.9839E − 01 | 3.1043E − 01 | −2.6363E − 01 | 1.8559E − 01 | −8.5520E − 02 | 2.4251E − 02 | −4.1100E − 03 | 1.8400E − 04 | −1.5000E − 05 |
| S14 | −1.4746E − 01 | 1.1305E − 01 | −6.5200E − 01 | 2.5753E − 02 | −6.7400E − 03 | 1.0800E − 03 | −9.0000E − 05 | 1.8500E − 06 | 1.4400E − 07 |

Table 12 shows the effective focal lengths f1-f7 of the respective lenses in Embodiment 4, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 12

| | | | |
|---|---|---|---|
| f1(mm) | 4.02 | f(mm) | 3.85 |
| f2(mm) | −15.97 | TTL(mm) | 4.82 |
| f3(mm) | 11.14 | ImgH(mm) | 3.34 |
| f4(mm) | −20.14 | | |
| f5(mm) | −57.01 | | |
| f6(mm) | 2.69 | | |
| f7(mm) | −1.92 | | |

Figure 8A:
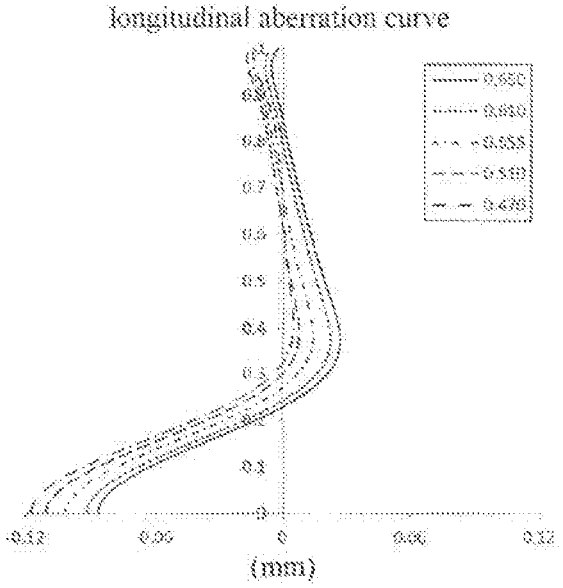
FIGS. 8A-8D respectively illustrate a longitudinal aberration curve, an astigmatic curve, a distortion curve, and a lateral color curve of the optical imaging lens assembly according to Embodiment 4.
Figure 8B:
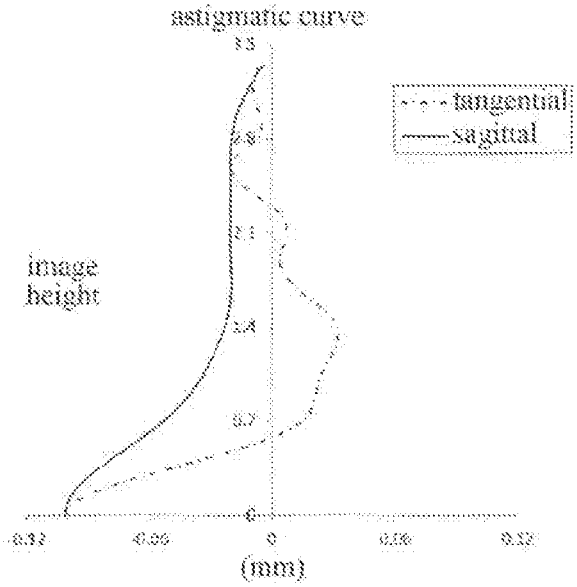
Figure 8C:
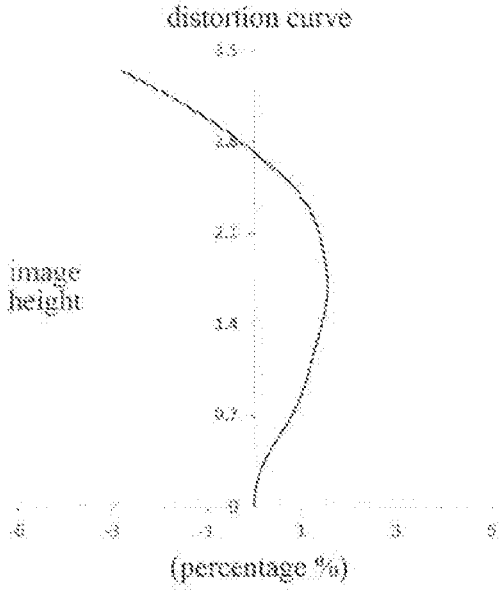
Figure 8D:
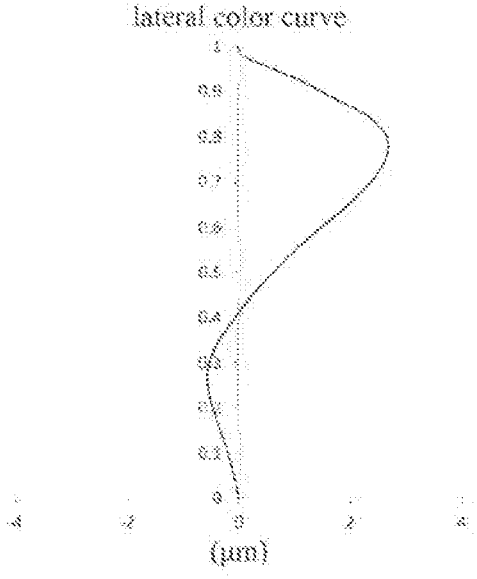

FIG. 8A illustrates the longitudinal aberration curve of the optical imaging lens assembly according to Embodiment 4, representing deviations of focal points of light of different wavelengths converged after passing through the lens assembly. FIG. 8B illustrates the astigmatic curve of the lens assembly according to Embodiment 4, representing a curvature of the tangential image plane and a curvature of the sagittal image plane. FIG. 8C illustrates the distortion curve of the optical imaging lens assembly according to Embodiment 4, representing amounts of distortion at different viewing angles. FIG. 8D illustrates the lateral color curve of the lens assembly according to Embodiment 4, representing deviations of different image heights on the image plane after light passes through the lens assembly. It can be seen from FIGS. 8A-8D that the optical imaging lens assembly according to Embodiment 4 can achieve a good imaging quality.

Embodiment 5

Figure 9:
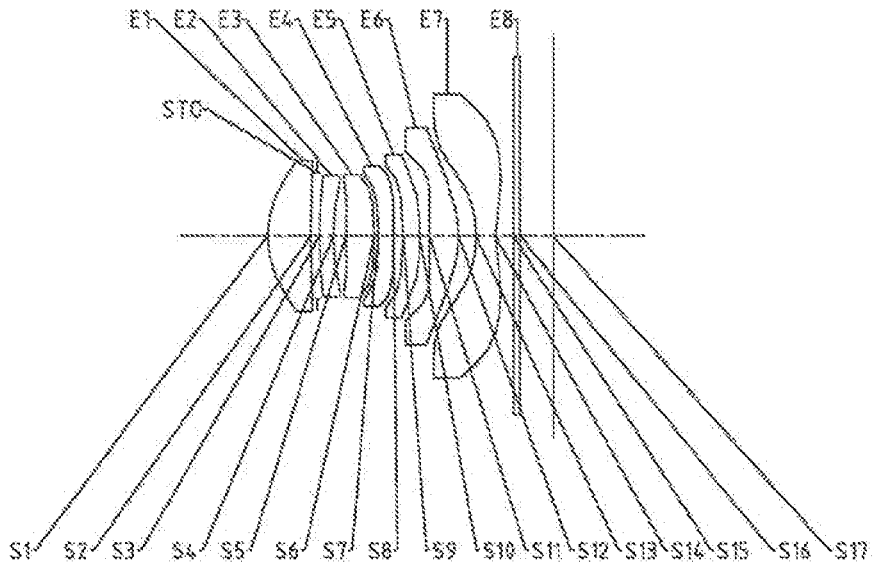
FIG. 9 is a schematic structural diagram illustrating an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 13 shows the surface type, the radius of curvature, the thickness, the material and the conic coefficient of each lens of the optical imaging lens assembly in Embodiment 5. The radius of curvature and the thickness are both in millimeters (mm).

TABLE 13

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.6750 | 0.7273 | 1.55 | 56.1 | −0.0623 |
| S2 | aspheric | 5.8618 | 0.1060 | | | −10.3301 |
| STO | spherical | infinite | 0.0400 | | | |
| S3 | aspheric | 5.5840 | 0.2300 | 1.67 | 20.4 | −11.2212 |
| S4 | aspheric | 3.5200 | 0.2132 | | | −4.4226 |
| S5 | aspheric | 2.6027 | 0.4765 | 1.55 | 56.1 | 74.8032 |
| S6 | aspheric | −9.4775 | 0.0600 | | | 49.4828 |
| S7 | aspheric | −51.6312 | 0.2581 | 1.67 | 20.4 | −99.0000 |
| S8 | aspheric | 13.7361 | 0.1634 | | | 53.6477 |
| S9 | aspheric | −12.6335 | 0.2824 | 1.67 | 20.4 | 89.3588 |
| S10 | aspheric | −16.9533 | 0.1672 | | | −72.9299 |
| S11 | aspheric | 9.6674 | 0.4857 | 1.55 | 56.1 | 37.6323 |
| S12 | aspheric | −1.6945 | 0.2925 | | | −8.7349 |
| S13 | aspheric | −2.9293 | 0.3256 | 1.54 | 55.7 | −1.4382 |
| S14 | aspheric | 1.6659 | 0.3046 | | | −15.1421 |
| S15 | spherical | infinite | 0.1100 | 1.52 | 64.2 | |
| S16 | spherical | infinite | 0.5574 | | | |
| S17 | spherical | infinite | | | | |

As may be obtained from Table 13, in Embodiment 5, the object-side surface and the image-side surface of any lens among the first to seventh lenses E1-E7 are both aspheric surfaces. Table 14 shows the high-order coefficients applicable to each aspheric surface in Embodiment 5. The surface type of each aspheric surface may be defined by the formula (1) given in Embodiment 1.

TABLE 15

| | | | |
|---|---|---|---|
| f1(mm) | 4.05 | f(mm) | 3.94 |
| f2(mm) | −14.97 | TTL(mm) | 4.80 |
| f3(mm) | 9.98 | ImgH(mm) | 3.36 |
| f4(mm) | −16.27 | | |
| f5(mm) | −76.47 | | |

| surface number | A4 | A6 | A8 | A10 | A12 | A14 | A16 | A18 | A20 |
|---|---|---|---|---|---|---|---|---|---|
| S1 | −1.7260E − 02 | 6.8051E − 02 | −2.2949E − 01 | 4.4964E − 01 | −5.6729E − 01 | 4.5059E − 01 | −2.1933E − 01 | 5.8548E − 02 | −6.4900E − 03 |
| S2 | −5.7290E − 02 | 1.5112E − 02 | 3.6099E − 02 | −1.1342E − 01 | 1.5791E − 01 | −1.3998E − 01 | 7.7662E − 02 | −2.4310E − 02 | 3.2580E − 03 |
| S3 | −1.2131E − 01 | 1.2347E − 01 | −1.2959E − 01 | 4.6878E − 01 | −1.0693E + 00 | 1.3614E + 00 | −9.6208E − 01 | 3.4927E − 01 | −4.7830E − 02 |
| S4 | −7.3950E − 02 | −6.9700E − 03 | 7.0336E − 01 | −3.3506E + 00 | 1.0202E + 01 | −1.9903E + 01 | 2.3804E + 01 | −1.5835E + 01 | 4.5041E + 00 |
| S5 | −6.5670E − 02 | 5.9553E − 02 | −5.3307E − 01 | 1.3721E + 00 | −1.7753E + 00 | 7.6472E − 02 | 2.8857E + 00 | −3.4441E + 00 | 1.3474E + 00 |
| S6 | −1.1546E − 01 | −4.0930E − 02 | 1.4215E − 01 | −9.5878E − 01 | 2.5269E + 00 | −3.6575E + 00 | 3.2872E + 00 | −1.7407E + 00 | 4.0778E − 01 |
| S7 | −2.4432E − 01 | 3.7026E − 01 | −1.1876E + 00 | 2.2278E + 00 | −2.6523E + 00 | 2.0459E + 00 | −8.0582E − 01 | −2.8830E − 02 | 9.0787E − 02 |
| S8 | −1.8359E − 01 | 2.3274E − 01 | −3.0643E − 01 | 1.7276E − 02 | 4.0842E − 01 | −5.0568E − 01 | 2.5393E − 01 | −5.1220E − 02 | 2.9410E − 03 |
| S9 | −1.6250E − 01 | 2.1360E − 01 | −2.8721E − 01 | 6.2611E − 01 | −1.6848E + 00 | 2.5613E + 00 | −2.1179E + 00 | 9.1352E − 01 | −1.6137E − 01 |
| S10 | −1.6941E − 01 | −7.3110E − 01 | 5.1071E − 01 | −9.0683E − 01 | 8.4206E − 01 | −4.6180E − 01 | 1.6512E − 01 | −3.8510E − 02 | 4.4030E − 03 |
| S11 | −3.2230E − 02 | −1.6901E − 01 | 4.5289E − 02 | 5.1759E − 01 | −1.1239E − 00 | 1.0955E + 00 | −5.7944E − 01 | 1.6147E − 01 | −1.8530E − 02 |
| S12 | 2.8779E − 02 | −1.5061E − 01 | 2.1817E − 01 | −1.6309E − 01 | 6.2391E − 02 | −8.4900E − 03 | −1.6200E − 03 | 6.6000E − 04 | −6.0000E − 05 |
| S13 | −2.7308E − 01 | 2.2675E − 01 | −1.3912E − 01 | 8.4432E − 02 | −3.7110E − 02 | 1.0919E − 02 | −1.6700E − 03 | 1.5000E − 04 | −5.7000E − 06 |
| S14 | −1.5661E − 01 | 1.3081E − 01 | −8.2490E − 02 | 3.6520E − 02 | −1.1160E − 02 | 2.2480E − 03 | −2.8000E − 04 | 1.9000E − 05 | −5.2000E − 07 |

Table 15 shows the effective focal lengths f1-f7 of the respective lenses in Embodiment 5, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 15-continued

| | |
|---|---|
| f6(mm) | 2.68 |
| f7(mm) | −1.93 |

Figure 10A:
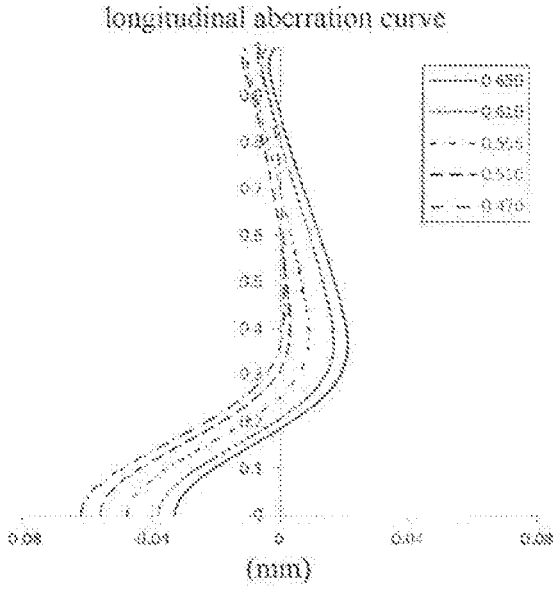
FIGS. 10A-10D respectively illustrate a longitudinal aberration curve, an astigmatic curve, a distortion curve, and a lateral color curve of the optical imaging lens assembly according to Embodiment 5.
Figure 10B:
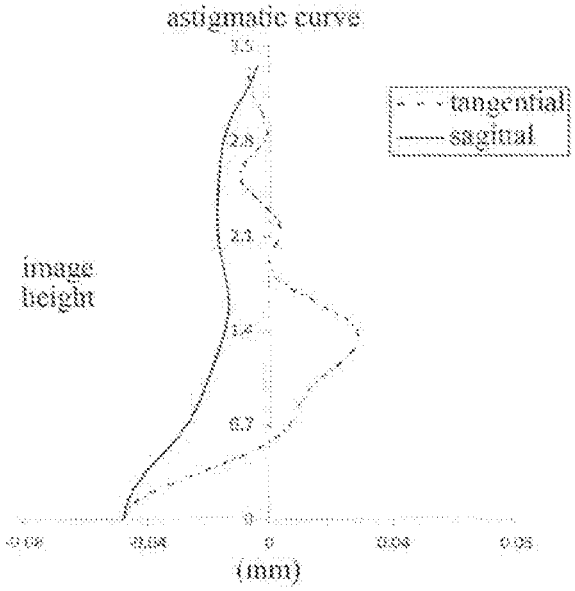
Figure 10C:
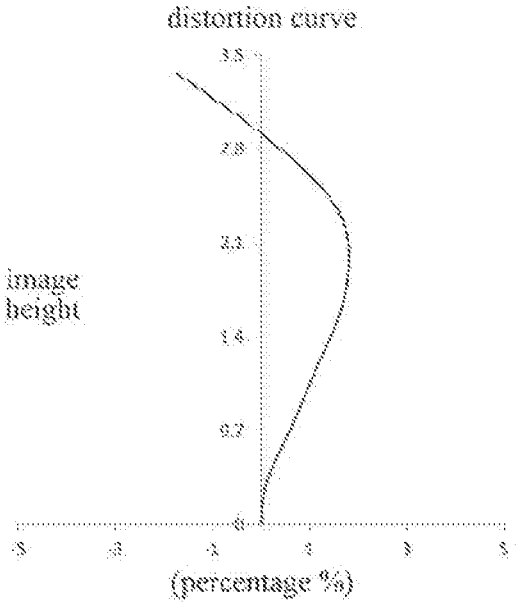
Figure 10D:
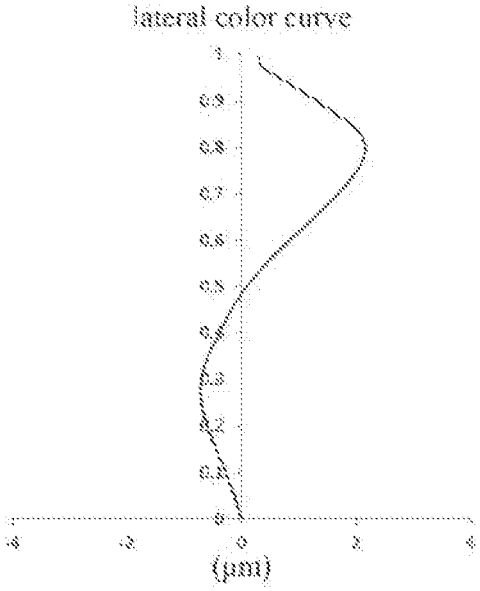

FIG. 10A illustrates the longitudinal aberration curve of the optical imaging lens assembly according to Embodiment 5, representing deviations of focal points of light of different wavelengths converged after passing through the lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the lens assembly. It can be seen from FIGS. 10A-10D that the optical imaging lens assembly according to Embodiment 5 can achieve a good imaging quality.

Embodiment 6

Figure 11:
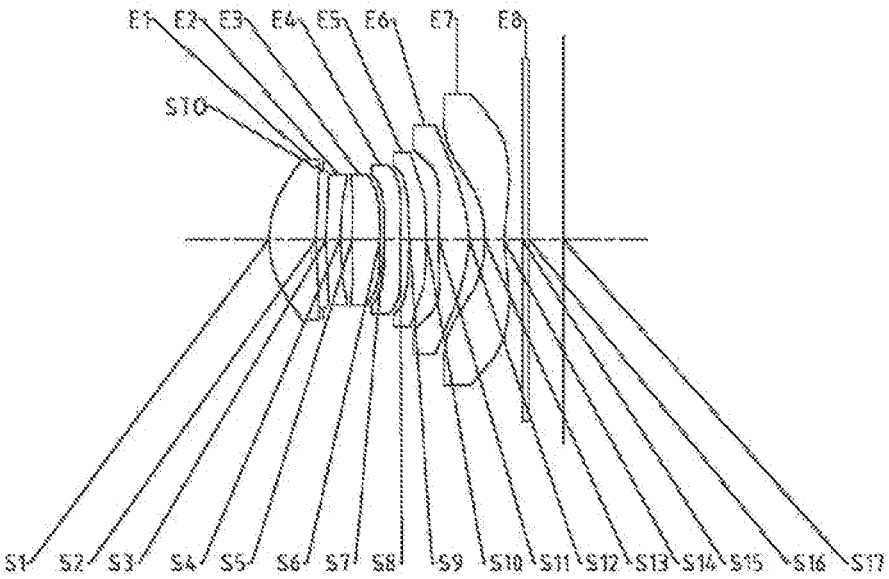
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 16 shows the surface type, the radius of curvature, the thickness, the material and the conic coefficient of each lens of the optical imaging lens assembly in Embodiment 6. The radius of curvature and the thickness are both in millimeters (mm).

TABLE 16

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.6526 | 0.7744 | 1.55 | 56.1 | −0.0179 |
| S2 | aspheric | 4.9179 | 0.1227 | | | −7.9777 |
| STO | spherical | infinite | 0.0400 | | | |
| S3 | aspheric | 6.0435 | 0.2300 | 1.67 | 20.4 | −28.3104 |
| S4 | aspheric | 3.7495 | 0.1965 | | | −7.3895 |
| S5 | aspheric | 8.7775 | 0.4612 | 1.55 | 56.1 | 59.7351 |
| S6 | aspheric | −23.7448 | 0.0700 | | | −98.8063 |
| S7 | aspheric | 17.7789 | 0.2588 | 1.67 | 20.4 | 89.8404 |
| S8 | aspheric | 7.4627 | 0.1456 | | | 33.5544 |
| S9 | aspheric | 201.7599 | 0.2788 | 1.67 | 20.4 | 99.0000 |
| S10 | aspheric | −497.1700 | 0.2044 | | | −99.0000 |
| S11 | aspheric | 8.5562 | 0.4943 | 1.55 | 56.1 | 28.5352 |
| S12 | aspheric | −1.7358 | 0.2558 | | | −10.1241 |
| S13 | aspheric | −3.1243 | 0.3115 | 1.54 | 55.7 | −1.4066 |
| S14 | aspheric | 1.6285 | 0.3050 | | | −14.5668 |
| S15 | spherical | infinite | 0.1100 | 1.52 | 64.2 | |
| S16 | spherical | infinite | 0.5578 | | | |
| S17 | spherical | infinite | | | | |

As may be obtained from Table 16, in Embodiment 6, the object-side surface and the image-side surface of any lens among the first to seventh lenses E1-E7 are both aspheric surfaces. Table 17 shows the high-order coefficients applicable to each aspheric surface in Embodiment 6. The surface type of each aspheric surface may be defined by the formula (1) given in Embodiment 1.

TABLE 17

| surface number | A4 | A6 | A8 | A10 | A12 | A14 | A16 | A18 | A20 |
|---|---|---|---|---|---|---|---|---|---|
| S1 | −2.2990E−02 | 9.6412E−02 | −2.9850E−01 | 5.4329E−01 | −6.2498E−01 | 4.4874E−01 | −1.9448E−01 | 4.5436E−02 | −4.3200E−03 |
| S2 | −4.4900E−02 | −1.4090E−02 | 8.1942E−02 | −1.7777E−01 | 2.3282E−01 | −1.9819E−01 | 1.0449E−01 | −3.0790E−02 | 3.8680E−03 |

TABLE 17-continued

| surface number | A4 | A6 | A8 | A10 | A12 | A14 | A16 | A18 | A20 |
|---|---|---|---|---|---|---|---|---|---|
| S3 | −1.1630E−01 | 9.8568E−02 | −1.5952E−01 | 6.0029E−01 | −1.1718E+00 | 1.2694E+00 | −7.7053E−01 | 2.4000E−01 | −2.7720E−02 |
| S4 | −7.0630E−02 | −3.7810E−02 | 6.6015E−01 | −2.6832E+00 | 7.4011E+00 | −1.3205E+01 | 1.4426E+01 | −8.7536E+00 | 2.2675E+00 |
| S5 | −5.2210E−02 | 1.7792E−02 | −4.3394E−01 | 1.3392E+00 | −2.4129E+00 | 2.2781E+00 | −6.7545E−01 | −5.0271E−01 | 3.4176E−01 |
| S6 | −1.1854E−01 | 1.5745E−01 | −7.5891E−01 | 1.5284E+00 | −1.9096E+00 | 1.3801E+00 | −3.3095E−01 | −1.8477E−01 | 9.6125E−02 |
| S7 | −2.4843E−01 | 4.7234E−01 | −1.4941E+00 | 2.8342E+00 | −3.4064E+00 | 2.5451E+00 | −1.0222E+00 | 1.2813E−01 | 1.7206E−02 |
| S8 | −1.8674E−01 | 2.3413E−01 | −3.2258E−01 | 5.7694E−02 | 4.4253E−01 | −6.6750E−01 | 4.3720E−01 | −1.4424E−01 | 2.0347E−02 |
| S9 | −1.4461E−01 | 2.1000E−01 | −4.9195E−01 | 1.2525E+00 | −2.5242E+00 | 3.1256E+00 | −2.2424E+00 | 8.5625E−01 | −1.3428E−01 |
| S10 | −1.4717E−01 | −4.0000E−04 | 1.6840E−01 | −2.7910E−01 | 1.9195E−01 | −4.6170E−02 | −3.6100E−03 | 2.3850E−03 | −1.0000E−04 |
| S11 | −9.6500E−03 | −1.8147E−01 | 2.0645E−01 | −1.4400E−03 | −3.1467E−01 | 3.7506E−01 | −2.0770E−01 | 5.8326E−02 | −6.6600E−03 |
| S12 | 2.4436E−02 | −1.2564E−01 | 2.2571E−01 | −2.0861E−01 | 1.0152E−01 | −2.5130E−02 | 2.3990E−03 | 1.2200E−04 | −2.9000E−05 |
| S13 | −2.8427E−01 | 2.6953E−01 | −2.0218E−01 | 1.3204E−01 | −5.7670E−02 | 1.5471E−02 | −2.4600E−03 | 2.1500E−04 | −7.9000E−06 |
| S14 | −1.6803E−01 | 1.5103E−01 | −1.0319E−01 | 4.9357E−02 | −1.6240E−02 | 3.5450E−03 | −4.9000E−04 | 3.7500E−05 | −1.2000E−06 |

Table 18 shows the effective focal lengths f1-f7of the respective lenses in Embodiment 6, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 18

| | | | |
|---|---|---|---|
| f1(mm) | 4.21 | f(mm) | 3.95 |
| f2(mm) | −15.46 | TTL(mm) | 4.82 |
| f3(mm) | 11.80 | ImgH(mm) | 3.34 |
| f4(mm) | −19.51 | | |
| f5(mm) | 215.62 | | |
| f6(mm) | 2.69 | | |
| f7(mm) | −1.95 | | |

Figure 12A:
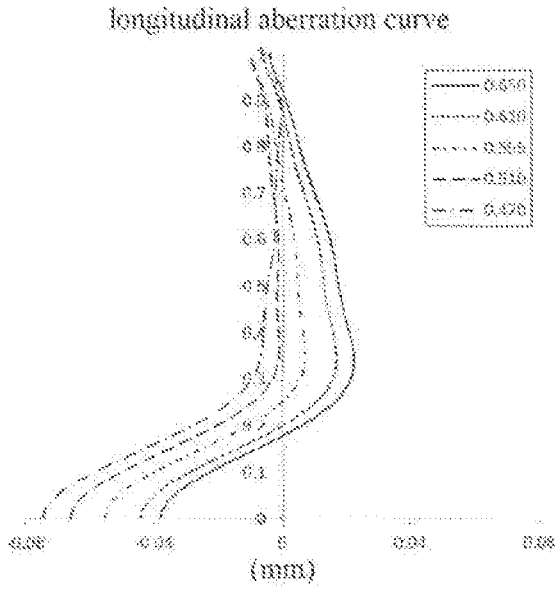
FIGS. 12A-12D respectively illustrate a longitudinal aberration curve, an astigmatic curve, a distortion curve, and a lateral color curve of the optical imaging lens assembly according to Embodiment 6.
Figure 12B:
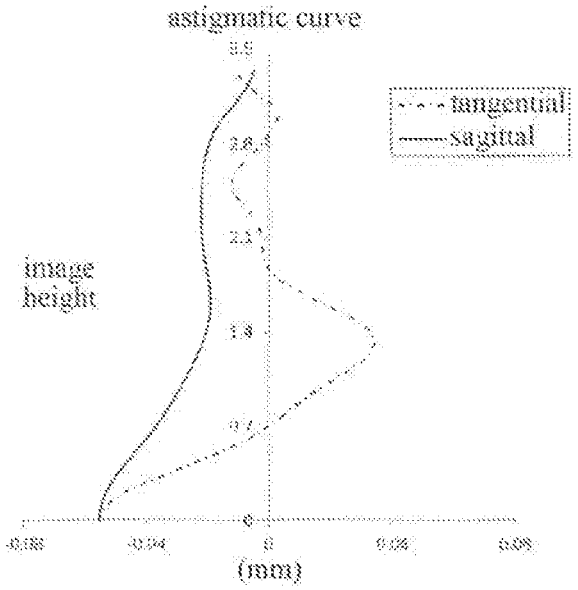
Figure 12C:
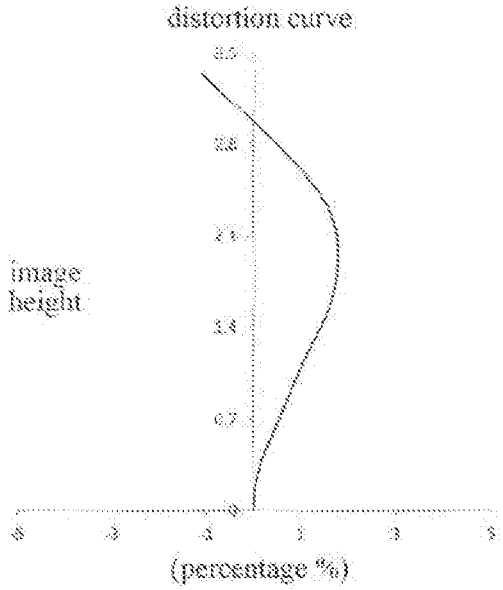
Figure 12D:
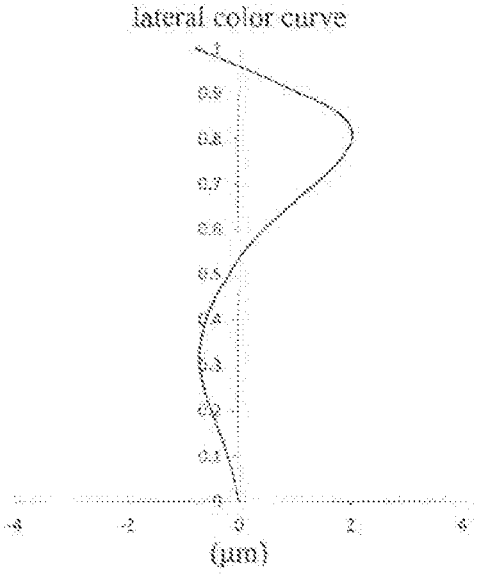

FIG. 12A illustrates the longitudinal aberration curve of the optical imaging lens assembly according to Embodiment 6, representing deviations of focal points of light of different wavelengths converged after passing through the lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the lens assembly. It can be seen from FIGS. 12A-12D that the optical imaging lens assembly according to Embodiment 6 can achieve a good imaging quality.

Embodiment 7

Figure 13:
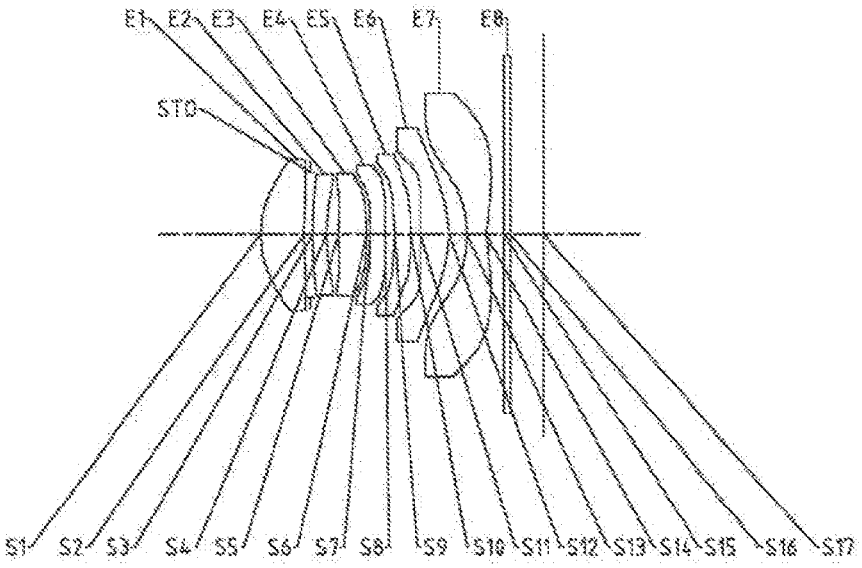
FIG. 13 is a schematic structural diagram illustrating an optical imaging lens assembly according to Embodiment 7 of the present disclosure.

An optical imaging lens assembly according to Embodiment 7 of the present disclosure is described below with reference to FIGS. 13-14D. FIG. 13 is a schematic structural diagram illustrating the optical imaging lens assembly according to Embodiment 7 of the present disclosure.

As shown in FIG. 13, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 19 shows the surface type, the radius of curvature, the thickness, the material and the conic coefficient of each lens of the optical imaging lens assembly in Embodiment 7. The radius of curvature and the thickness are both in millimeters (mm).

TABLE 19

| surface number | surface type | radius of curvature | thickness | material: refractive index | material: abbe number | conic coefficient |
|---|---|---|---|---|---|---|
| OBJ | spherical | infinite | infinite | | | |
| S1 | aspheric | 1.6770 | 0.7364 | 1.55 | 56.1 | −0.0566 |
| S2 | aspheric | 5.6504 | 0.1091 | | | −9.5792 |

TABLE 19-continued

| surface number | surface type | radius of curvature | thickness | material refractive index | material abbe number | conic coefficient |
|---|---|---|---|---|---|---|
| STO | spherical | infinite | 0.0400 | | | |
| S3 | aspheric | 5.5717 | 0.2300 | 1.67 | 20.4 | −11.2918 |
| S4 | aspheric | 3.5890 | 0.2080 | | | −4.6149 |
| S5 | aspheric | 12.1907 | 0.4758 | 1.55 | 56.1 | 75.4970 |
| S6 | aspheric | −9.4060 | 0.0600 | | | 48.6557 |
| S7 | aspheric | −58.4894 | 0.2539 | 1.67 | 20.4 | 99.0000 |
| S8 | aspheric | 12.4212 | 0.1608 | | | 51.3574 |
| S9 | aspheric | −12.7628 | 0.2891 | 1.67 | 20.4 | 92.9118 |
| S10 | aspheric | −16.5685 | 0.1617 | | | −44.7911 |
| S11 | aspheric | 9.3158 | 0.4868 | 1.55 | 56.1 | 35.4018 |
| S12 | aspheric | −1.7122 | 0.3004 | | | −9.0470 |
| S13 | aspheric | −2.9542 | 0.3262 | 1.54 | 55.7 | −1.4352 |
| S14 | aspheric | 1.6722 | 0.3045 | | | −14.7187 |
| S15 | spherical | infinite | 0.1100 | 1.52 | 64.2 | |
| S16 | spherical | infinite | 0.5573 | | | |
| S17 | spherical | infinite | | | | |

As may be obtained from Table 19, in Embodiment 7, the object-side surface and the image-side surface of any lens among the first to seventh lenses E1-E7 are both aspheric surfaces. Table 20 shows the high-order coefficients applicable to each aspheric surface in Embodiment 7. The surface type of each aspheric surface may be defined by the formula (1) given in Embodiment 1.

TABLE 20

| surface number | A4 | A6 | A8 | A10 | A12 | A14 |
|---|---|---|---|---|---|---|
| S1 | −1.9030E−02 | 7.5352E−02 | −2.5016E−01 | 4.8666E−01 | −6.0904E−01 | 4.8019E−01 |
| S2 | −5.4640E−02 | 1.2288E−02 | 2.6543E−02 | −7.7780E−02 | 9.9760E−02 | −8.4420E−02 |
| S3 | −1.1890E−01 | 1.2950E−01 | −2.1427E−01 | 7.7503E−01 | −1.6828E+00 | 2.1105E+00 |
| S4 | −7.0740E−02 | −2.4680E−02 | 7.2864E−01 | −3.2732E+00 | 9.7183E+00 | −1.8780E+01 |
| S5 | −6.6870E−02 | 8.0941E−02 | −6.9384E−01 | 2.0745E+00 | −3.6917E+00 | 3.3671E+00 |
| S6 | −1.0324E−01 | −6.9140E−02 | 2.0517E−01 | −1.0637E+00 | 2.6216E+00 | −3.6931E+00 |
| S7 | −2.4602E−01 | 4.2832E−01 | −1.4790E+00 | 2.9561E+00 | −3.6749E+00 | 2.7958E+00 |
| S8 | −1.8124E−01 | 2.1875E−01 | −2.3501E−01 | −2.3922E−01 | 9.5595E−01 | −1.1901E+00 |
| S9 | −1.6076E−01 | 2.5397E−01 | −4.9472E−01 | 1.1880E+00 | −2.6258E+00 | 3.5744E+00 |
| S10 | −1.5446E−01 | −1.4282E−01 | 7.1051E−01 | −1.2868E+00 | 1.3156E+00 | −8.3280E−01 |
| S11 | −2.3350E−02 | −1.9653E−01 | 8.8314E−02 | 4.7121E−01 | −1.0930E+00 | 1.0875E+00 |
| S12 | 3.3003E−02 | −1.5378E−01 | 2.0922E−01 | −1.4299E−01 | 4.3131E−02 | 1.5880E−03 |
| S13 | −2.6632E−01 | 2.0595E−01 | −1.1276E−01 | 6.6190E−02 | −2.9530E−02 | 8.2360E−03 |
| S14 | −1.6128E−01 | 1.3708E−01 | −8.8350E−02 | 4.0417E−02 | −1.2900E−02 | 2.7510E−03 |

| surface number | A16 | A18 | A20 |
|---|---|---|---|
| S1 | −2.3186E−01 | 6.1452E−02 | −6.7700E−03 |
| S2 | 4.5863E−02 | −1.4180E−02 | 1.8750E−03 |
| S3 | −1.5152E+00 | 5.7618E−01 | −8.7480E−02 |
| S4 | 2.2425E+01 | −1.4954E+01 | 4.2738E+00 |
| S5 | −5.6571E−01 | −1.4283E+00 | 8.4680E−01 |
| S6 | 3.2825E+00 | −1.7308E+00 | 4.0448E−01 |
| S7 | −9.7928E−01 | −1.1882E−01 | 1.3513E−01 |
| S8 | 7.5466E−01 | −2.5232E−01 | 3.7370E−02 |
| S9 | −2.7909E+00 | 1.1589E+00 | −1.9827E−01 |
| S10 | 3.3780E−01 | −8.1750E−02 | 8.8720E−03 |
| S11 | −5.8336E−01 | 1.6465E−01 | −1.9120E−02 |
| S12 | −4.6000E−03 | 1.1260E−03 | −9.0000E−05 |
| S13 | −1.3600E−03 | 1.2300E−04 | −4.7000E−06 |
| S14 | −3.7000E−04 | 2.8100E−05 | −9.1000E−07 |

Table 21 shows the effective focal lengths f1-f7 of the respective lenses in Embodiment 7, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 21

| | | | |
|---|---|---|---|
| f1(mm) | 4.10 | f(mm) | 3.91 |
| f2(mm) | −15.89 | TTL(mm) | 4.81 |
| f3(mm) | 9.80 | ImgH(mm) | 3.38 |
| f4(mm) | −15.37 | | |
| f5(mm) | −86.08 | | |

TABLE 21-continued

| | |
|---|---|
| f6(mm) | 2.69 |
| f7(mm) | −1.94 |

Figure 14A:
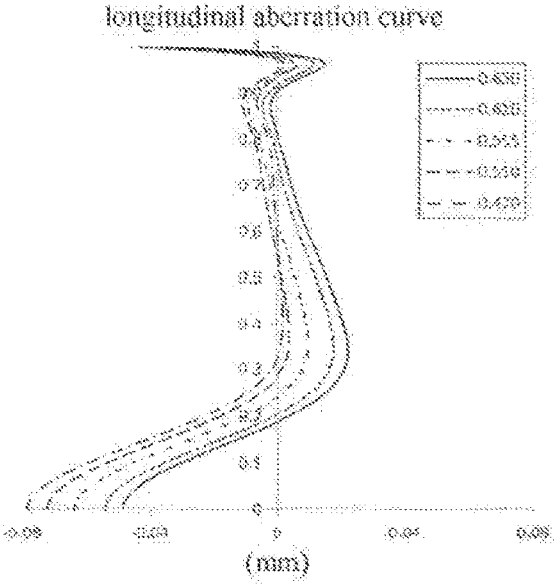
FIGS. 14A-14D respectively illustrate a longitudinal aberration curve, an astigmatic curve, a distortion curve, and a lateral color curve of the optical imaging lens assembly according to Embodiment 7.
Figure 14B:
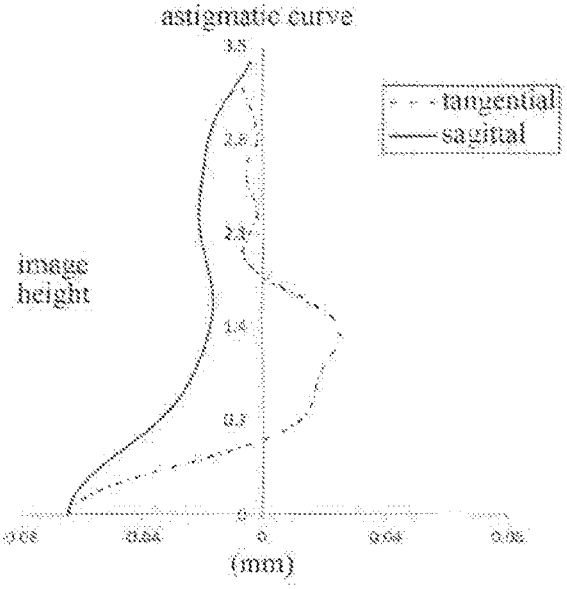
Figure 14C:
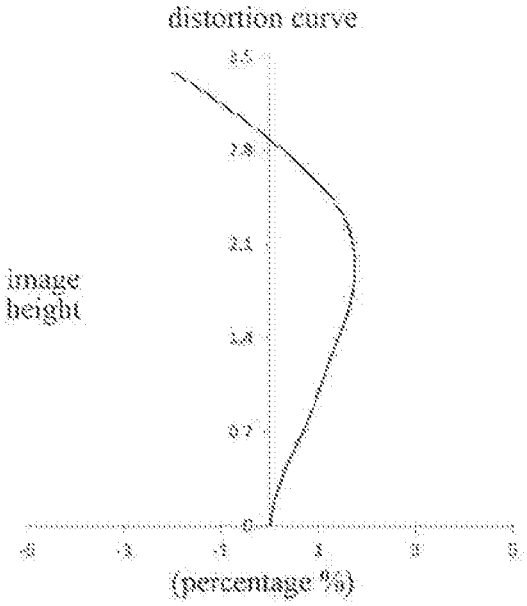
Figure 14D:
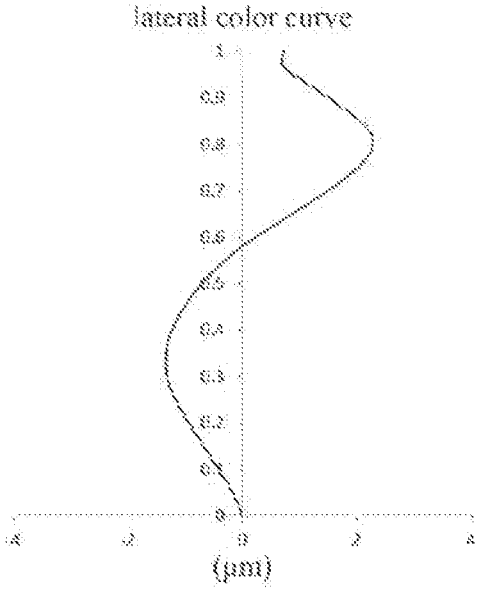

FIG. 14A illustrates the longitudinal aberration curve of the optical imaging lens assembly according to Embodiment 7, representing deviations of focal points of light of different wavelengths converged after passing through the lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the lens assembly. It can be seen from FIGS. 14A-14D that the optical imaging lens assembly according to Embodiment 7 can achieve a good imaging quality.

Embodiment 8

Figure 15:
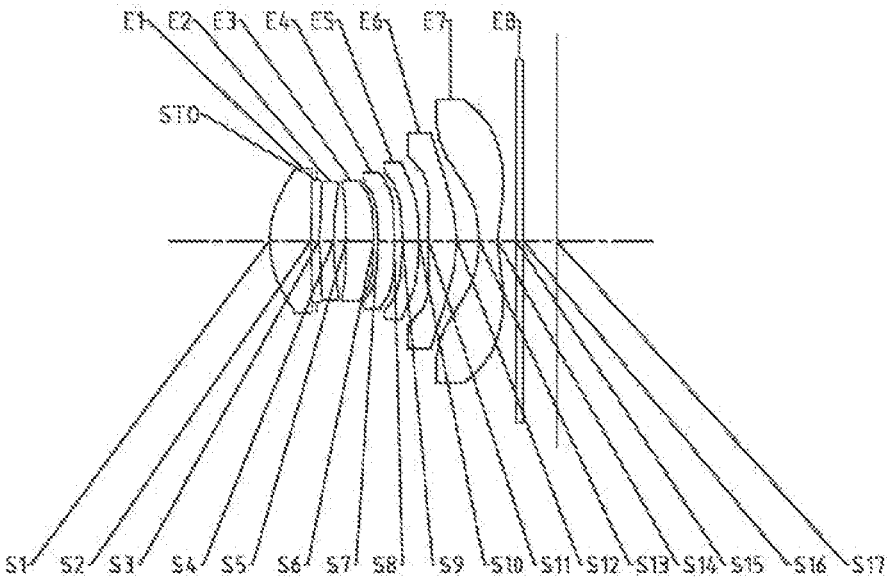
FIG. 15 is a schematic structural diagram illustrating an optical imaging lens assembly according to Embodiment 8 of the present disclosure.

An optical imaging lens assembly according to Embodiment 8 of the present disclosure is described below with reference to FIGS. 15-16D. FIG. 15 is a schematic structural diagram illustrating the optical imaging lens assembly according to Embodiment 8 of the present disclosure.

As shown in FIG. 15, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface 511 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 22 shows the surface type, the radius of curvature, the thickness, the material and the conic coefficient of each lens of the optical imaging lens assembly in Embodiment 8. The radius of curvature and the thickness are both in millimeters (mm).

TABLE 22

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.6681 | 0.6789 | 1.55 | 56.1 | −0.1076 |
| S2 | aspheric | 6.4700 | 0.0977 | | | −14.5084 |
| STO | spherical | infinite | 0.0400 | | | |
| S3 | aspheric | 6.3252 | 0.2346 | 1.67 | 20.4 | −13.9417 |
| S4 | aspheric | 4.1795 | 0.2027 | | | −7.9043 |
| S5 | aspheric | 130.2306 | 0.4580 | 1.55 | 56.1 | 99.0000 |
| S6 | aspheric | −7.5496 | 0.0700 | | | 53.9205 |
| S7 | aspheric | −15.3798 | 0.2631 | 1.67 | 20.4 | 99.0000 |
| S8 | aspheric | −314.8320 | 0.1356 | | | −99.0000 |
| S9 | aspheric | −8.3601 | 0.2662 | 1.67 | 20.4 | 51.2127 |
| S10 | aspheric | −13.4416 | 0.1553 | | | −78.7624 |
| S11 | aspheric | 9.9106 | 0.4670 | 1.55 | 56.1 | 44.5943 |
| S12 | aspheric | −1.7365 | 0.3590 | | | −13.4666 |
| S13 | aspheric | −3.0354 | 0.3083 | 1.54 | 55.7 | −1.3098 |
| S14 | aspheric | 1.6296 | 0.3026 | | | −16.7446 |
| S15 | spherical | infinite | 0.1100 | 1.52 | 64.2 | |
| S16 | spherical | infinite | 0.5554 | | | |
| S17 | spherical | infinite | | | | |

As may be obtained from Table 22, in Embodiment 8, the object-side surface and the image-side surface of any lens among the first to seventh lenses E1-E7 are both aspheric surfaces. Table 23 shows the high-order coefficients applicable to each aspheric surface in Embodiment 8. The surface type of each aspheric surface may be defined by the formula (1) given in Embodiment 1.

TABLE 23

| surface number | A4 | A6 | A8 | A10 | A12 | A14 | A16 | A18 | A20 |
|---|---|---|---|---|---|---|---|---|---|
| S1 | −2.7000E−02 | 1.3381E−01 | −4.7609E−01 | 1.0048E+00 | −1.348E+00 | 1.1376E+00 | −5.8510E−01 | 1.6553E−01 | −1.9570E−02 |
| S2 | −6.0890E−02 | −4.5000E−05 | 1.4826E−01 | −4.6498E−01 | 8.1381E−01 | −8.9752E−01 | 6.0390E−01 | −2.2540E−01 | 3.5723E−02 |
| S3 | −1.3370E−01 | 2.4910E−01 | −9.4772E−01 | 3.7054E+00 | −8.9618E+00 | 1.3295E+01 | −1.1864E+01 | 5.8601E+00 | −1.2288E+00 |
| S4 | −7.0870E−02 | −9.3510E−02 | 1.3573E+00 | −6.4228E+00 | 1.9222E+01 | −3.6966E+01 | 4.4062E+01 | −2.9617E+01 | 8.6336E+00 |
| S5 | −5.5950E−02 | −1.4029E−01 | 7.2036E−01 | −3.5267E+00 | 1.0430E+01 | −1.9359E+01 | 2.2043E+01 | −1.4172E+01 | 4.0089E+00 |
| S6 | −1.3976E−01 | −1.5729E−01 | 1.6681E+00 | −8.1718E+00 | 2.1503E+01 | −3.3904E+01 | 3.2455E+01 | −1.7436E+01 | 4.0322E+00 |
| S7 | −3.0373E−01 | 5.7895E−01 | −1.9464E+00 | 4.0577E+00 | −5.6361E+00 | 4.8159E+00 | −1.5019E+00 | −8.6748E−01 | 5.9068E−01 |
| S8 | −1.8090E−01 | −2.1730E−01 | 2.5574E+00 | −9.4381E+00 | 1.8761E+01 | −2.2527E+01 | 1.6492E+01 | −6.8388E+00 | 1.2376E+00 |
| S9 | −1.6898E−01 | −2.8920E−02 | 1.3734E+00 | −4.3093E+00 | 6.6017E+00 | −6.2090E+00 | 3.9630E+00 | −1.6668E+00 | 3.4116E−01 |
| S10 | −1.8094E−01 | −1.1353E−01 | 7.5605E−01 | 1.2196E+00 | 5.9388E−01 | 4.9136E−01 | −7.3783E−01 | 3.3389E−01 | −5.3470E−02 |
| S11 | −9.4500E−03 | −2.5279E−01 | 3.0755E−01 | 1.1036E−01 | −8.5286E−01 | 1.0697E+00 | −6.4076E−01 | 1.9293E−01 | −2.3430E−02 |
| S12 | −2.0570E−02 | −3.7170E−02 | 1.7938E−01 | −2.8558E−01 | 2.3254E−01 | −1.0782E−01 | 2.8998E−02 | −4.2300E−03 | 2.6100E−04 |
| S13 | −3.0751E−01 | 3.4077E−01 | −3.1625E−01 | 2.3588E−01 | −1.1315E−01 | 3.3205E−02 | −5.8000E−03 | 5.5300E−04 | −2.2000E−05 |
| S14 | −1.5369E−01 | 1.3093E−01 | −8.9180E−02 | 4.3295E−02 | −1.4420E−02 | 3.1540E−03 | −4.3000E−04 | 3.2200E−05 | −1.0000E−06 |

Table 24 shows the effective focal lengths f1-f7 of the respective lenses in Embodiment 8, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 24

| | | | |
|---|---|---|---|
| f1(mm) | 3.92 | f(mm) | 3.82 |
| f2(mm) | −19.35 | TTL(mm) | 4.70 |
| f3(mm) | 13.09 | ImgH(mm) | 3.36 |
| f4(mm) | −24.30 | | |
| f3(mm) | −33.93 | | |
| f6(mm) | 2.75 | | |
| f7(mm) | −1.93 | | |

Figure 16A:
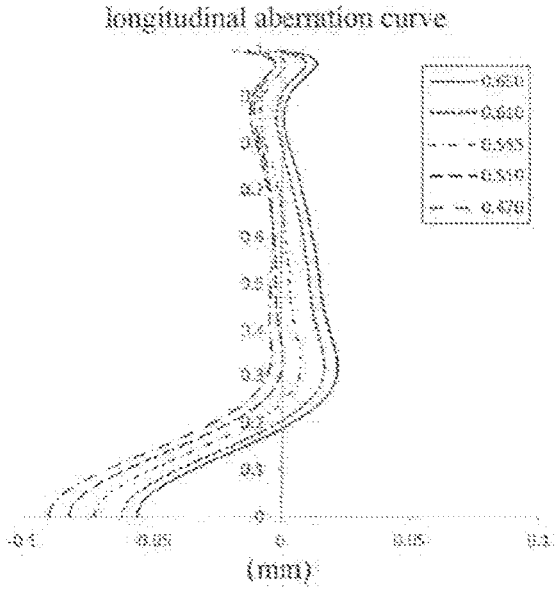
FIGS. 16A-16D respectively illustrate a longitudinal aberration curve, an astigmatic curve, a distortion curve, and a lateral color curve of the optical imaging lens assembly according to Embodiment 8.
Figure 16B:
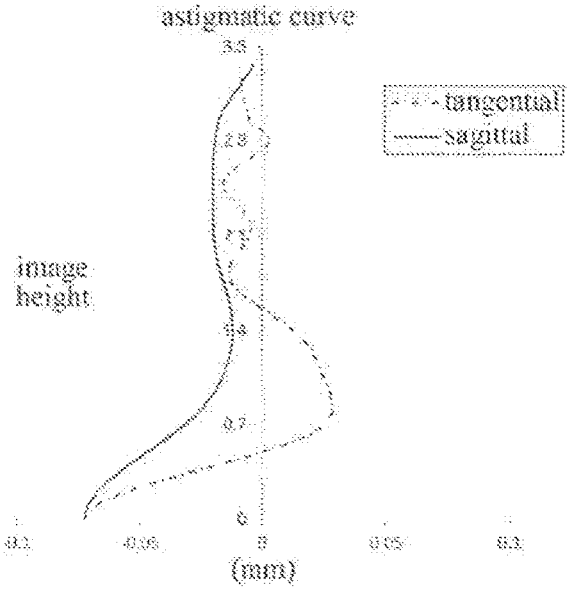
Figure 16C:
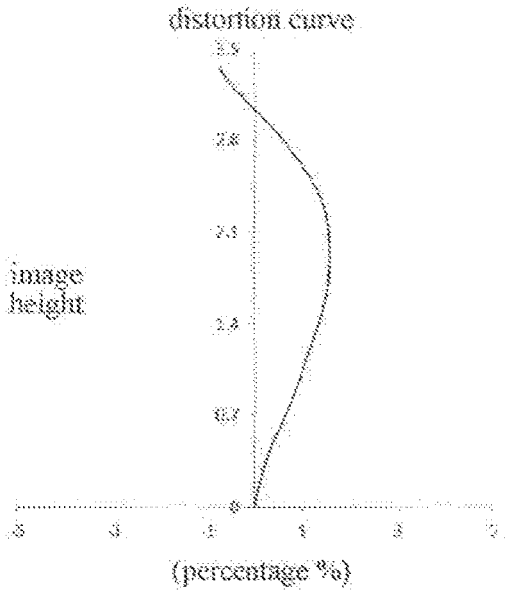
Figure 16D:
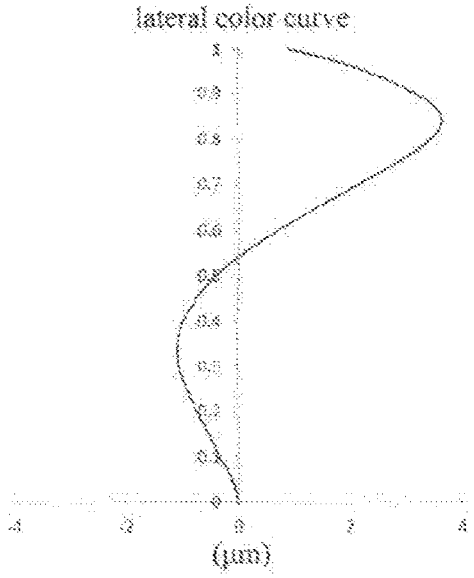

FIG. 16A illustrates the longitudinal aberration curve of the optical imaging lens assembly according to Embodiment 8, representing deviations of focal points of light of different wavelengths converged after passing through the lens assembly. FIG. 16B illustrates the astigmatic curve of the optical imaging lens assembly according to Embodiment 8, representing a curvature of the tangential image plane and a curvature of the sagittal image plane. FIG. 16C illustrates the distortion curve of the optical imaging lens assembly according to Embodiment 8, representing amounts of distortion at different viewing angles. FIG. 16D illustrates the lateral color curve of the optical imaging lens assembly according to Embodiment 8, representing deviations of different image heights on the image plane after light passes through the lens assembly. It can be seen from FIGS. 16A-16D that the optical imaging lens assembly according to Embodiment 8 can achieve a good imaging quality.

Embodiment 9

Figure 17:
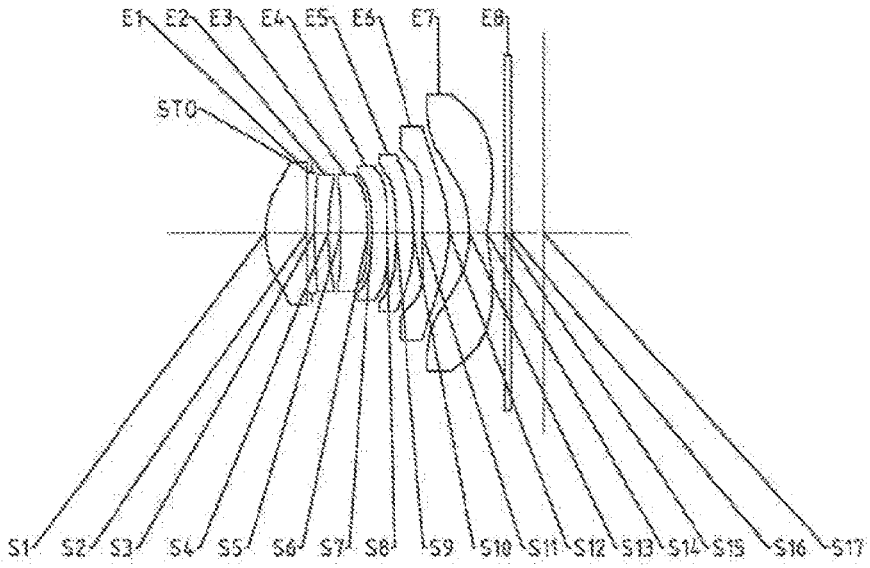
FIG. 17 is a schematic structural diagram illustrating an optical imaging lens assembly according to Embodiment 9 of the present disclosure.

An optical imaging lens assembly according to Embodiment 9 of the present disclosure is described below with reference to FIGS. 17-18D. FIG. 17 is a schematic structural diagram illustrating the optical imaging lens assembly according to Embodiment 9 of the present disclosure.

As shown in FIG. 17, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 25 shows the surface type, the radius of curvature, the thickness, the material and the conic coefficient of each lens of the optical imaging lens assembly in Embodiment 9. The radius of curvature and the thickness are both in millimeters (mm).

TABLE 25

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.6562 | 0.6938 | 1.55 | 56.1 | −0.1366 |
| S2 | aspheric | 7.0991 | 0.0933 | | | −14.5353 |
| STO | spherical | infinite | 0.0400 | | | |
| S3 | aspheric | 6.6566 | 0.2326 | 1.67 | 20.4 | 3.0678 |
| S4 | aspheric | 3.9957 | 0.2121 | | | −3.4649 |
| S5 | aspheric | 33.3863 | 0.4559 | 1.55 | 56.1 | 99.0000 |
| S6 | aspheric | −8.6820 | 0.0700 | | | 61.8981 |
| S7 | aspheric | −32.6449 | 0.2499 | 1.67 | 20.4 | 22.6435 |
| S8 | aspheric | 19.5229 | 0.1578 | | | −49.7187 |
| S9 | aspheric | −11.1681 | 0.2980 | 1.67 | 20.4 | 83.6636 |
| S10 | aspheric | −16.5667 | 0.1557 | | | 14.4277 |
| S11 | aspheric | 10.1120 | 0.4563 | 1.55 | 56.1 | 44.6883 |
| S12 | aspheric | −1.7208 | 0.3271 | | | −11.4462 |
| S13 | aspheric | −3.0226 | 0.3009 | 1.54 | 55.7 | −1.3309 |
| S14 | aspheric | 1.6395 | 0.2919 | | | −16.1993 |
| S15 | spherical | infinite | 0.1100 | 1.52 | 64.2 | |
| S16 | spherical | infinite | 0.5447 | | | |
| S17 | spherical | infinite | | | | |

As may be obtained from Table 25, in Embodiment 9, the object-side surface and the image-side surface of any lens among the first to seventh lenses E1-E7 are both aspheric surfaces. Table 26 shows the high-order coefficients applicable to each aspheric surface in Embodiment 9. The surface type of each aspheric surface may be defined by the formula (1) given in Embodiment 1.

TABLE 26

| surface number | A4 | A6 | A8 | A10 | A12 | A14 | A16 | A18 | A20 |
|---|---|---|---|---|---|---|---|---|---|
| S1 | −2.2620E−02 | 1.0553E−01 | −3.7553E−01 | 7.8141E−01 | −1.0466E+00 | 8.8543E−01 | −4.6094E−01 | 1.3307E−01 | −1.6160E−02 |
| S2 | −6.0040E−02 | −1.0330E−02 | 2.0487E−01 | −6.1586E−01 | 1.0285E+00 | −1.0673E+00 | 6.7380E−01 | −2.3631E−01 | 3.5264E−02 |
| S3 | −1.2715E−01 | 1.9884E−01 | −5.0188E−01 | 1.9033E+00 | −4.6772E+00 | 6.9937E+00 | −6.2273E+00 | 3.0508E+00 | −6.3124E−01 |
| S4 | −7.2510E−02 | −6.9990E−02 | 1.4853E+00 | −7.8475E+00 | 2.5424E+01 | −5.1810E+01 | 6.4338E+01 | −4.4436E+01 | 1.3136E+01 |
| S5 | −8.4960E−02 | 1.2516E−01 | −1.1373E+00 | 4.4366E+00 | −1.0823E+01 | 1.6138E+01 | −1.3829E+01 | 5.7840E+00 | −6.4253E−01 |
| S6 | −2.1479E−01 | 5.3499E−01 | −2.4030E+00 | 6.3186E+00 | −1.0998E+01 | 1.2640E−01 | −8.9673E+00 | 3.4515E+00 | −5.3232E−01 |
| S7 | −3.2318E−01 | 6.8338E−01 | −2.2423E+00 | 4.2313E+00 | −4.4320E+00 | 1.5752E+00 | 1.8228E+00 | −2.3198E+00 | 7.7517E−01 |
| S8 | −2.1930E−01 | 2.5688E−01 | 3.2200E−03 | −1.6873E+00 | 4.5341E+00 | −6.1466E+00 | 4.7670E+00 | −2.0287E+00 | 3.7102E−01 |
| S9 | −1.7134E−01 | 1.2516E−01 | 3.4906E−01 | −1.4318E+00 | 2.0855E+00 | −1.6302E+00 | 7.2452E−01 | −1.7717E−01 | 2.0883E−02 |
| S10 | −1.7822E−01 | −9.1830E−02 | 6.9725E−01 | −1.3950E+00 | 1.4778E+00 | −9.1275E−01 | 3.3653E−01 | −6.9360E−02 | 6.1290E−03 |
| S11 | −8.6500E−03 | −3.7510E−01 | 7.9218E−01 | −9.1083E−01 | 4.8218E−01 | −2.1400E−02 | −1.0577E−01 | 4.9792E−02 | −7.3900E−03 |
| S12 | 5.1810E−03 | −1.4263E−01 | 3.5248E−01 | −4.3468E−01 | 3.0218E−01 | −1.2372E−01 | 2.9730E−02 | −3.9000E−03 | 2.1500E−04 |
| S13 | −3.0314E−01 | 3.2065E−01 | −2.7383E−01 | 1.9151E−01 | −8.7630E−02 | 2.4717E−02 | −4.1700E−03 | 3.8800E−04 | −1.5000E−05 |
| S14 | −1.5355E−01 | 1.3084E−01 | −8.7770E−02 | 4.1201E−02 | −1.3150E−02 | 2.7380E−03 | −3.5000E−04 | 2.4600E−05 | −7.0000E−07 |

Table 27 shows the effective focal lengths f1-f7of the respective lenses in Embodiment 9, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 27

| | | | |
|---|---|---|---|
| f1(mm) | 3.79 | f(mm) | 3.87 |
| f2(mm) | −15.56 | TTL(mm) | 4.69 |
| f3(mm) | 12.67 | ImgH(mm) | 3.36 |
| f4(mm) | −18.32 | | |
| f5(mm) | −52.64 | | |
| f6(mm) | 2.73 | | |
| f7(mm) | −1.94 | | |

Figure 18A:
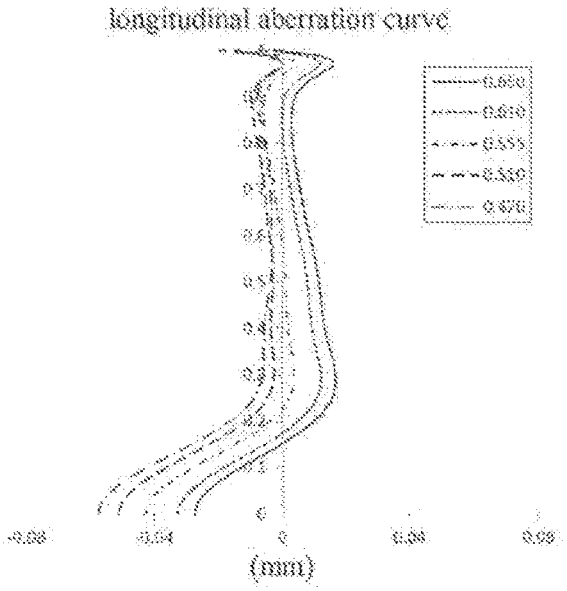
FIGS. 18A-18D respectively illustrate a longitudinal aberration curve, an astigmatic curve, a distortion curve, and a lateral color curve of the optical imaging lens assembly according to Embodiment 9.
Figure 18B:
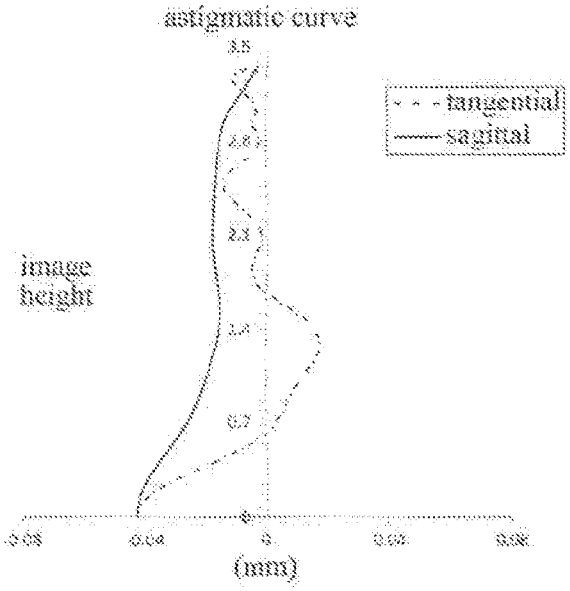
Figure 18C:
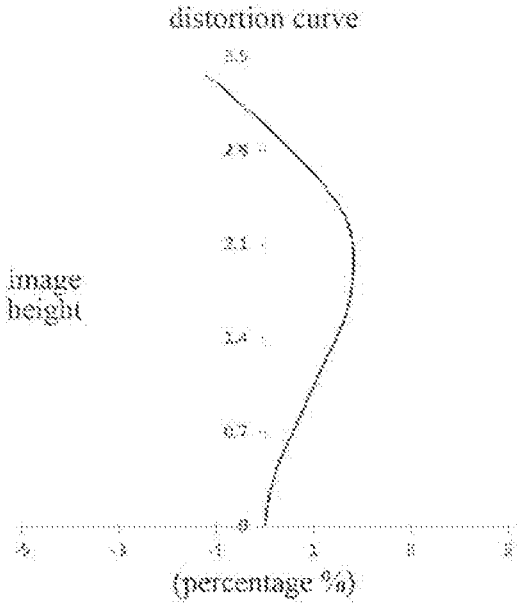
Figure 18D:
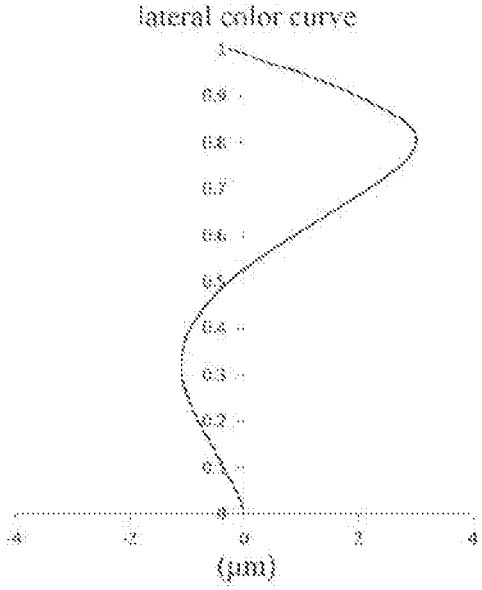

FIG. 18A illustrates the longitudinal aberration curve of the optical imaging lens assembly according to Embodiment 9, representing deviations of focal points of light of different wavelengths converged after passing through the lens assembly. FIG. 18B illustrates the astigmatic curve of the optical imaging lens assembly according to Embodiment 9, representing a curvature of the tangential image plane and a curvature of the sagittal image plane. FIG. 18C illustrates the distortion curve of the optical imaging lens assembly according to Embodiment 9, representing amounts of distortion at different viewing angles. FIG. 18D illustrates the lateral color curve of the optical imaging lens assembly according to Embodiment 9, representing deviations of different image heights on the image plane after light passes through the lens assembly. It can be seen from FIGS. 18A-18D that the optical imaging lens assembly according to Embodiment 9 can achieve a good imaging quality.

Embodiment 10

Figure 19:
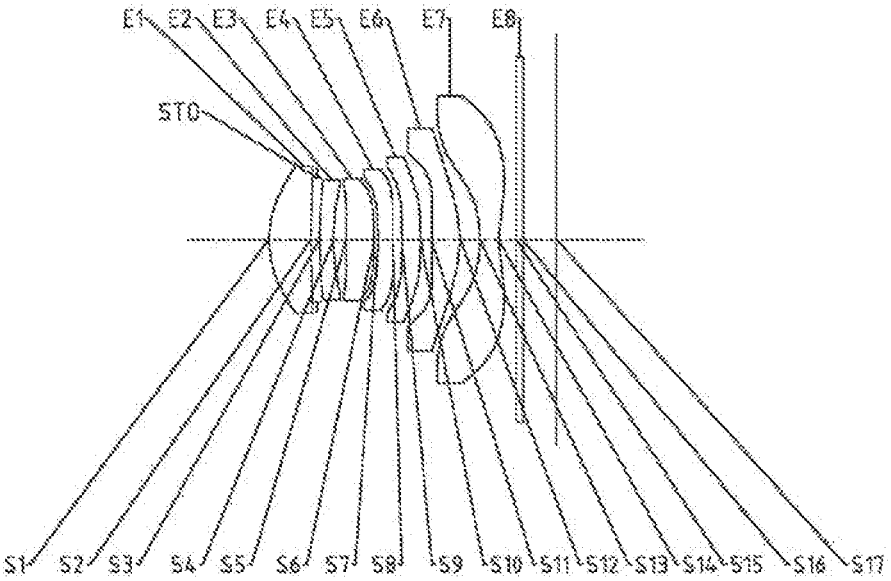
FIG. 19 is a schematic structural diagram illustrating an optical imaging lens assembly according to Embodiment 10 of the present disclosure.

An optical imaging lens assembly according to Embodiment 10 of the present disclosure is described below with reference to FIGS. 19-20D. FIG. 19 is a schematic structural diagram illustrating the optical imaging lens assembly according to Embodiment 10 of the present disclosure.

As shown in FIG. 19, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 28 shows the surface type, the radius of curvature, the thickness, the material and the conic coefficient of each lens of the optical imaging lens assembly in Embodiment 10. The radius of curvature and the thickness are both in millimeters (mm).

TABLE 28

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.6490 | 0.6904 | 1.55 | 56.1 | −0.1181 |
| S2 | aspheric | 5.9180 | 0.1016 | | | −15.7506 |
| STO | spherical | infinite | 0.0400 | | | |
| S3 | aspheric | 5.6983 | 0.2300 | 1.67 | 20.4 | −7.0855 |
| S4 | aspheric | 3.5428 | 0.2082 | | | −3.9431 |
| S5 | aspheric | 14.2190 | 0.4622 | 1.55 | 56.1 | −23.9406 |
| S6 | aspheric | −9.7417 | 0.0600 | | | 58.7646 |
| S7 | aspheric | −119.8980 | 0.2407 | 1.67 | 20.4 | 99.0000 |
| S8 | aspheric | 10.0940 | 0.1493 | | | −70.8319 |
| S9 | aspheric | −65.0945 | 0.3006 | 1.67 | 20.4 | −99.0000 |
| S10 | aspheric | −61.8179 | 0.1830 | | | −99.0000 |
| S11 | aspheric | 10.1306 | 0.4706 | 1.55 | 56.1 | 44.5735 |
| S12 | aspheric | −1.7183 | 0.3213 | | | −11.9523 |
| S13 | aspheric | −3.0241 | 0.3042 | 1.54 | 55.7 | −1.3600 |
| S14 | aspheric | 1.6394 | 0.2907 | | | −15.7329 |
| S15 | spherical | infinite | 0.1100 | 1.52 | 64.2 | |
| S16 | spherical | infinite | 0.5435 | | | |
| S17 | spherical | infinite | | | | |

As may be obtained from Table 28, in Embodiment 10, the object-side surface and the image-side surface of any lens among the first to seventh lenses E1-E7 are both aspheric surfaces. Table 29 shows the high-order coefficients applicable to each aspheric surface in Embodiment 10. The surface type of each aspheric surface may be defined by the formula (1) given in Embodiment 1.

TABLE 29

| surface number | A4 | A6 | A8 | A10 | A12 | A14 | A16 | A18 | A20 |
|---|---|---|---|---|---|---|---|---|---|
| S1 | −1.7380E−02 | 7.7566E−02 | −.2.8554E−01 | 6.0469E−01 | −8.1997E−01 | 6.9609E−01 | −3.6082E−01 | 1.0257E−01 | −1.2110E−02 |
| S2 | −6.2860E−02 | 8.9000E−03 | 1.1926E−01 | −3.9342E−01 | 6.7405E−01 | −7.1367E−01 | 4.5798E−01 | −1.6266E−01 | 2.4514E−02 |
| S3 | −1.3630E−01 | 1.7966E−01 | −3.1396E−01 | 1.1530E+00 | −2.7793E+00 | 3.9676E+00 | −3.3025E+00 | 1.4884E+00 | −2.7783E−01 |
| S4 | −8.2400E−02 | −7.8900E−03 | 9.9858E−01 | −5.1836E+00 | 1.6731E+01 | −3.4440E+01 | 4.3488E+01 | −3.0618E+01 | 9.2406E+00 |
| S5 | −7.9330E−02 | 1.6065E−01 | −1.4462E+00 | 5.8240E+00 | −1.4636E+01 | 2.2568E+01 | −2.0366E+01 | 9.4812E+00 | −1.5474E+00 |
| S6 | −1.7268E−01 | 1.9280E−01 | −8.8212E−01 | 2.0155E+00 | −2.9087E+00 | 2.5489E+00 | −9.4930E−01 | −2.0031E−01 | 1.8613E−01 |
| S7 | −2.9779E−01 | 5.4750E−01 | −1.8255E+00 | 3.8506E+00 | −5.1559E+00 | 4.2182E+00 | −1.7133E+00 | 3.9857E−02 | 1.2704E−01 |
| S8 | −2.1558E−01 | 3.6186E−01 | −6.5395E−01 | 6.2028E−01 | −1.7674E−01 | −3.1684E−01 | 3.9401E−01 | −1.8547E−01 | 3.5077E−02 |
| S9 | −1.8084E−01 | 1.1928E−01 | 3.7779E−01 | −1.6145E+00 | 2.6698E+00 | −2.5092E+00 | 1.3608E+00 | −3.7886E−01 | 3.9035E−02 |
| S10 | −1.9847E−01 | 6.1582E−02 | 1.3811E−01 | −3.1057E−01 | 2.4267E−01 | −6.3750E−02 | −5.2000E−03 | 3.5010E−03 | −6.2000E−05 |
| S11 | −2.3980E−02 | −2.1877E−01 | 3.5142E−01 | −2.6565E−01 | −5.8380E−02 | 2.3261E−01 | −1.5984E−01 | 4.8651E−02 | −5.7000E−03 |
| S12 | −1.9100E−02 | −4.3450E−02 | 1.6225E−01 | −2.2485E−01 | 1.6350E−01 | −6.8010E−02 | 1.6380E−02 | −2.1400E−03 | 1.1700E−04 |
| S13 | −3.0199E−01 | 3.1892E−01 | −2.7941E−01 | 2.0261E−01 | −9.5650E−02 | 2.7733E−02 | −4.8100E−03 | 4.5900E−04 | −1.9000E−05 |
| S14 | −1.5254E−01 | 1.2322E−01 | −7.6850E−02 | 3.3295E−02 | −9.7300E−03 | 1.8120E−03 | −2.0000E−04 | 1.0400E−05 | −1.3000E−07 |

Table 30 shows the effective focal lengths f1-f7 of the respective lenses in Embodiment 10, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 30

| | | | |
|---|---|---|---|
| f1(mm) | 3.96 | f(mm) | 3.89 |
| f2(mm) | −14.69 | TTL(mm) | 4.71 |
| f3(mm) | 10.66 | ImgH(mm) | 3.34 |
| f4(mm) | −13.97 | | |
| f5(mm) | 1779.54 | | |
| f6(mm) | 2.73 | | |
| f7(mm) | −1.94 | | |

Figure 20A:
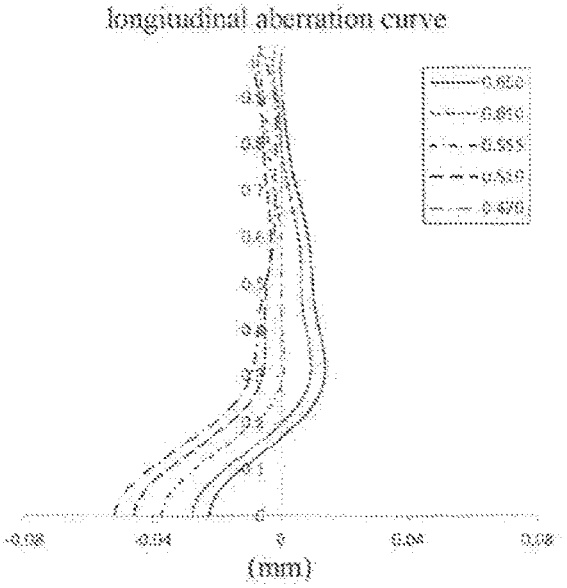
FIGS. 20A-20D respectively illustrate a longitudinal aberration curve, an astigmatic curve, a distortion curve, and a lateral color curve of the optical imaging lens assembly according to Embodiment 10.
Figure 20B:
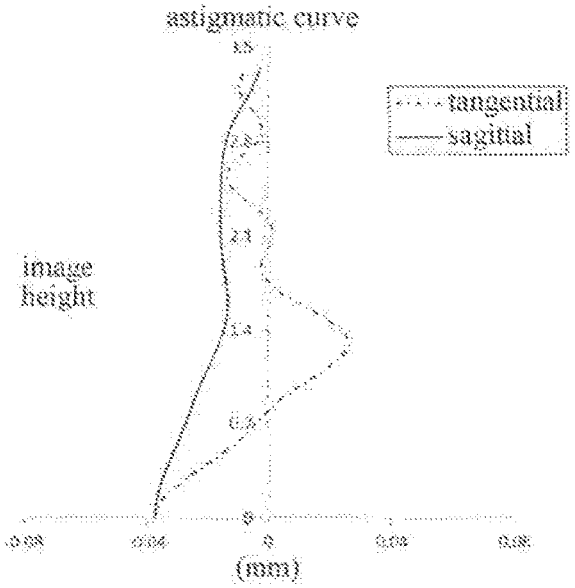
Figure 20C:
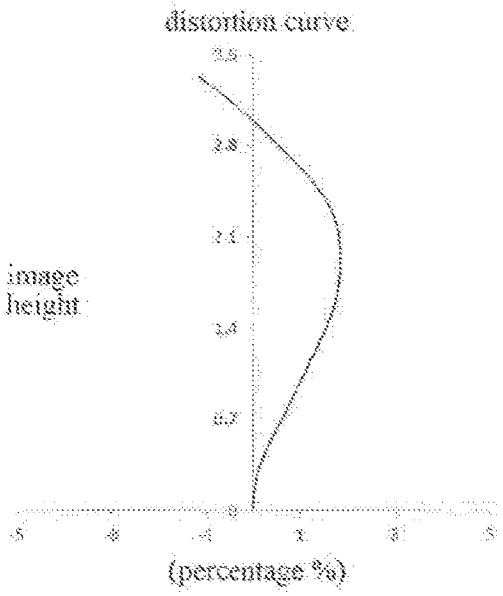
Figure 20D:
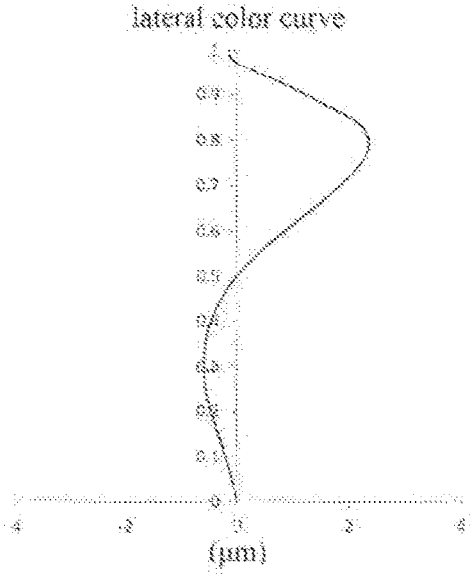

FIG. 20A illustrates the longitudinal aberration curve of the optical imaging lens assembly according to Embodiment 10, representing deviations of focal points of light of different wavelengths converged after passing through the lens assembly. FIG. 20B illustrates the astigmatic curve of the optical imaging lens assembly according to Embodiment 10, representing a curvature of the tangential image plane and a curvature of the sagittal image plane. FIG. 20C illustrates the distortion curve of the optical imaging lens assembly according to Embodiment 10, representing amounts of distortion at different viewing angles. FIG. 20D illustrates the lateral color curve of the optical imaging lens assembly according to Embodiment 10, representing deviations of different image heights on the image plane after light passes through the lens assembly. It can be seen from FIGS. 20A-20D that the optical imaging lens assembly according to Embodiment 10 can achieve a good imaging quality.

Embodiment 11

Figure 21:
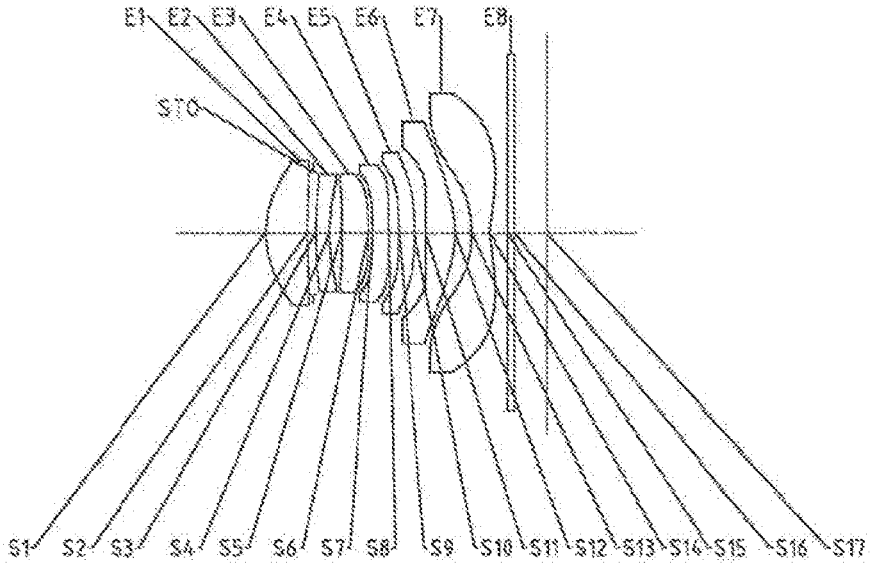
FIG. 21 is a schematic structural diagram illustrating an optical imaging lens assembly according to Embodiment 11 of the present disclosure.

An optical imaging lens assembly according to Embodiment 11 of the present disclosure is described below with reference to FIGS. 21-22D. FIG. 21 is a schematic structural diagram illustrating the optical imaging lens assembly according to Embodiment 11 of the present disclosure.

As shown in FIG. 21, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 31 shows the surface type, the radius of curvature, the thickness, the material and the conic coefficient of each lens of the optical imaging lens assembly in Embodiment 11. The radius of curvature and the thickness are both in millimeters (mm).

TABLE 31

| surface number | surface type | radius of curvature | thickness | material: refractive index | material: abbe number | conic coefficient |
|---|---|---|---|---|---|---|
| OBJ | spherical | infinite | infinite | | | |
| S1 | aspheric | 1.6412 | 0.6986 | 1.55 | 56.1 | −0.1192 |
| S2 | aspheric | 5.7580 | 0.1026 | | | −16.4815 |
| STO | spherical | infinite | 0.0400 | | | |
| S3 | aspheric | 5.4284 | 0.2300 | 1.67 | 20.4 | −7.9765 |
| S4 | aspheric | 3.4584 | 0.2055 | | | −3.4895 |
| S5 | aspheric | 13.0646 | 0.4471 | 1.55 | 56.1 | 37.5886 |
| S6 | aspheric | −17.9056 | 0.0650 | | | −99.0000 |
| S7 | aspheric | 39.5440 | 0.2793 | 1.67 | 20.4 | −62.8799 |
| S8 | aspheric | 16.3602 | 0.1737 | | | 47.7653 |
| S9 | aspheric | −12.1547 | 0.2692 | 1.67 | 20.4 | 87.3608 |
| S10 | aspheric | −18.7459 | 0.1845 | | | −64.7304 |
| S11 | aspheric | 10.5842 | 0.4978 | 1.55 | 56.1 | 41.4357 |
| S12 | aspheric | −1.7131 | 0.2741 | | | −11.0587 |
| S13 | aspheric | −3.0050 | 0.3066 | 1.54 | 55.7 | −1.3581 |
| S14 | aspheric | 1.6121 | 0.2976 | | | −15.7143 |
| S15 | spherical | infinite | 0.1100 | 1.52 | 64.2 | |
| S16 | spherical | infinite | 0.5504 | | | |
| S17 | spherical | infinite | | | | |

As may be obtained from Table 31, in Embodiment 11, the object-side surface and the image-side surface of any lens among the first to seventh lenses E1-E7 are both aspheric surfaces. Table 32 shows the high-order coefficients applicable to each aspheric surface in Embodiment 11. The surface type of each aspheric surface may be defined by the formula (1) given in Embodiment 1.

TABLE 32

| surface number | A4 | A6 | A8 | A10 | A12 | A14 | A16 | A18 | A20 |
|---|---|---|---|---|---|---|---|---|---|
| S1 | −1.6240E−02 | 7.0344E−02 | −2.6148E−01 | 5.4968E−01 | −7.3946E−01 | 6.2268E−01 | −3.2092E−01 | 9.0937E−02 | −1.0720E−02 |
| S2 | −6.3190E−02 | 1.1604E−02 | 9.7205E−02 | −3.2132E−01 | 5.4132E−01 | −5.6494E−01 | 3.5854E−01 | −1.2624E−01 | 1.8889E−02 |
| S3 | −1.3608E−01 | 1.8562E−01 | −3.9985E−01 | 1.5701E+00 | −3.8963E+00 | 5.7667E+00 | −5.0323E+00 | 2.4024E+00 | −4.8255E−01 |
| S4 | −7.9540E−02 | −2.5910E−02 | 1.0713E+00 | −5.2608E+00 | 1.6271E+01 | −3.2328E+01 | 3.9608E+01 | −2.7157E+01 | 8.0043E+00 |
| S5 | −7.9240E−02 | 1.6525E−01 | −1.3571E+00 | 5.3378E+00 | −1.1373E+01 | 2.0927E+01 | −1.9571E+01 | 9.7706E+00 | −1.8691E+00 |
| S6 | −2.2401E−01 | 4.2030E−01 | −1.9596E+00 | 5.6196E+00 | −1.0869E+01 | 1.3811E+01 | −1.0781E+01 | 4.6252E+00 | −8.3228E−01 |
| S7 | −3.0103E−01 | 5.6466E−01 | −1.9663E+00 | 4.6390E+00 | −7.4520E+00 | 7.9855E+00 | −5.2942E+00 | 1.9057E+00 | −2.8973E−01 |
| S8 | −1.8959E−01 | 2.3251E−01 | −2.5152E−01 | −1.8550E−01 | 9.5978E−01 | −1.4359E+00 | 1.1311E+00 | −4.7758E−01 | 8.6829E−02 |
| S9 | −1.6698E−01 | 1.0682E−01 | 2.8352E−01 | −1.0654E+00 | 1.4622E+00 | −1.0733E+00 | 3.9277E−01 | −3.5080E−02 | −1.0150E−02 |
| S10 | −1.9234E−01 | 5.4477E−02 | 1.6822E−01 | −3.5857E−01 | 2.9158E−01 | −1.0800E−01 | 2.5089E−02 | −8.2900E−03 | 1.8160E−03 |
| S11 | −2.3410E−02 | −2.4441E−01 | 4.9879E−01 | −6.3858E−01 | 4.9699E−01 | −2.6359E−01 | 1.0016E−01 | −2.4950E−02 | 2.9750E−03 |
| S12 | −3.1300E−03 | −8.8940E−02 | 2.015311−01 | −2.2562E−01 | 1.4146E−01 | −5.1430E−02 | 1.0732E−02 | −1.1900E−03 | 5.3100E−05 |
| S13 | −3.0455E−01 | 3.1545E−01 | −2.6327E−01 | 1.8306E−01 | −8.3550E−02 | 2.3428E−02 | −3.9200E−03 | 3.6000E−04 | −1.4000E−05 |
| S14 | −1.5685E−01 | 1.3077E−01 | −8.3160E−02 | 3.6409E−02 | −1.0670E−02 | 1.9720E−03 | −2.1000E−04 | 9.9900E−06 | −5.5000E−08 |

Table 33 shows the effective focal lengths f1-f7 of the respective lenses in Embodiment 11, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 33

| | | | |
|---|---|---|---|
| f1(mm) | 3.97 | f(mm) | 3.95 |
| f2(mm) | −15.02 | TTL(mm) | 4.73 |
| f3(mm) | 13.91 | ImgH(mm) | 3.35 |
| f4(mm) | −42.12 | | |
| f5(mm) | −52.79 | | |
| f6(mm) | 2.74 | | |
| f7(mm) | −1.91 | | |

Figure 22A:
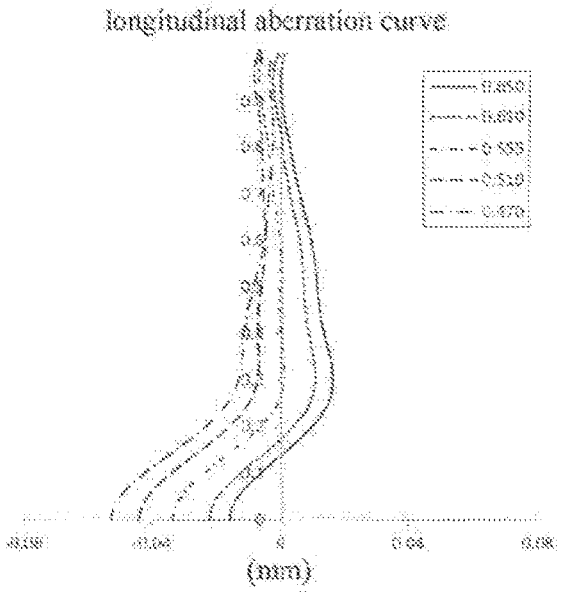
FIGS. 22A-22D respectively illustrate a longitudinal aberration curve, an astigmatic curve, a distortion curve, and a lateral color curve of the optical imaging lens assembly according to Embodiment 11.
Figure 22B:
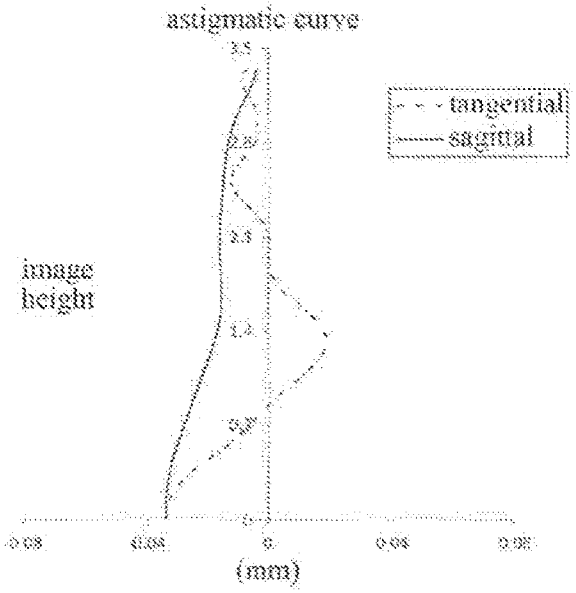
Figure 22C:
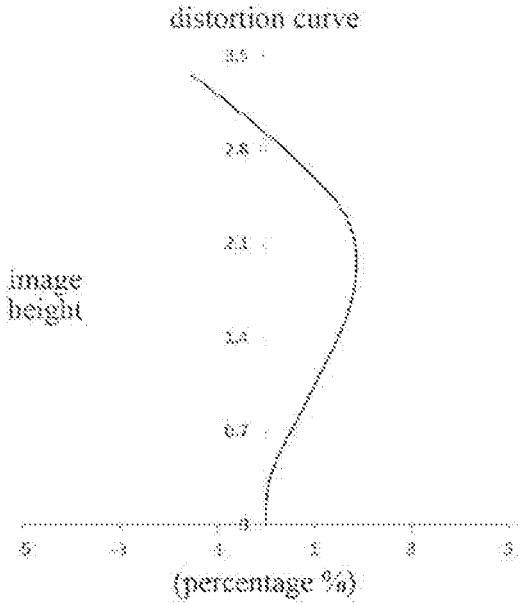
Figure 22D:
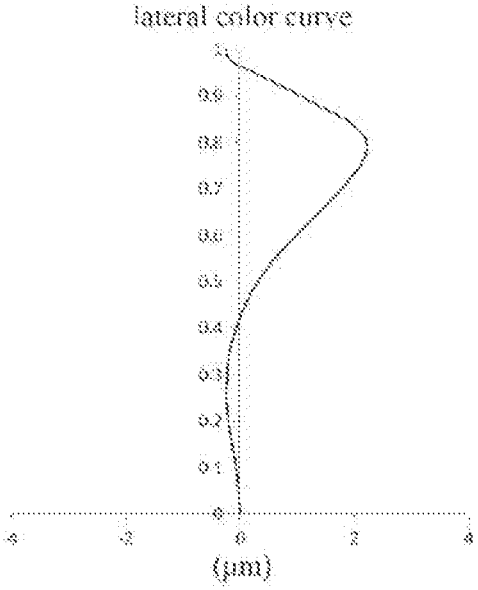

FIG. 22A illustrates the longitudinal aberration curve of the optical imaging lens assembly according to Embodiment 11, representing deviations of focal points of light of different wavelengths converged after passing through the lens assembly. FIG. 22B illustrates the astigmatic curve of the optical imaging lens assembly according to Embodiment 11, representing a curvature of the tangential image plane and a curvature of the sagittal image plane. FIG. 22C illustrates the distortion curve of the optical imaging lens assembly according to Embodiment 11, representing amounts of distortion at different viewing angles. FIG. 22D illustrates the lateral color curve of the optical imaging lens assembly according to Embodiment 11, representing deviations of different image heights on the image plane after light passes through the lens assembly. It can be seen from FIGS. 22A-22D that the optical imaging lens assembly according to Embodiment 11 can achieve a good imaging quality.

Embodiment 12

Figure 23:
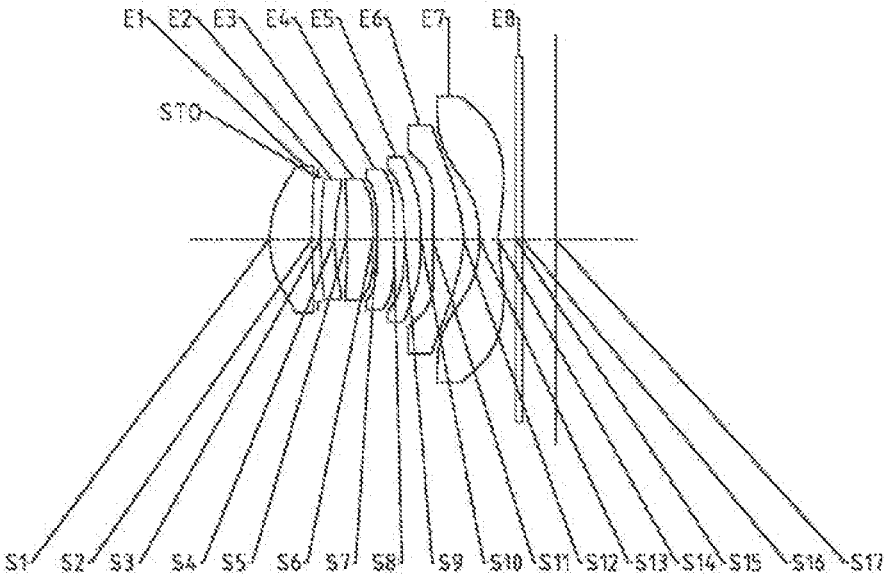
FIG. 23 is a schematic structural diagram illustrating an optical imaging lens assembly according to Embodiment 12 of the present disclosure.

An optical imaging lens assembly according to Embodiment 12 of the present disclosure is described below with reference to FIGS. 23-24D. FIG. 23 is a schematic structural diagram illustrating the optical imaging lens assembly according to Embodiment 12 of the present disclosure.

As shown in FIG. 23, the optical imaging lens assembly according to the exemplary embodiments of the present disclosure includes, sequentially from an object side to an image side along an optical axis, a first lens E1, a diaphragm STO, a second lens E2, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 34 shows the surface type, the radius of curvature, the thickness, the material and the conic coefficient of each lens of the optical imaging lens assembly in Embodiment 12. The radius of curvature and the thickness are both in millimeters (mm).

TABLE 34

| surface number | surface type | radius of curvature | thickness | material: refractive index | material: abbe number | conic coefficient |
|---|---|---|---|---|---|---|
| OBJ | spherical | infinite | infinite | | | |
| S1 | aspheric | 1.6368 | 0.6978 | 1.55 | 56.1 | −0.1191 |

TABLE 34-continued

| surface number | surface type | radius of curvature | thickness | material refractive index | material abbe number | conic coefficient |
|---|---|---|---|---|---|---|
| S2 | aspheric | 5.7298 | 0.1028 | | | −16.7004 |
| STO | spherical | infinite | 0.0400 | | | |
| S3 | aspheric | 5.3950 | 0.2300 | 1.67 | 20.4 | −7.9391 |
| S4 | aspheric | 3.4031 | 0.2045 | | | −3.1585 |
| S5 | aspheric | 11.9768 | 0.4273 | 1.55 | 56.1 | 33.1956 |
| S6 | aspheric | 100.0000 | 0.0650 | | | −99.0000 |
| S7 | aspheric | 11.0278 | 0.2783 | 1.67 | 20.4 | −35.9270 |
| S8 | aspheric | 15.4004 | 0.1793 | | | 89.0948 |
| S9 | aspheric | −12.6749 | 0.2610 | 1.67 | 20.4 | 87.5077 |
| S10 | aspheric | −20.9226 | 0.1963 | | | −99.0000 |
| S11 | aspheric | 10.3194 | 0.5021 | 1.55 | 56.1 | 42.4025 |
| S12 | aspheric | −1.7145 | 0.2653 | | | −10.9203 |
| S13 | aspheric | −3.0009 | 0.3030 | 1.54 | 55.7 | −1.3538 |
| S14 | aspheric | 1.5936 | 0.2901 | | | −15.6887 |
| S15 | spherical | infinite | 0.1100 | 1.57 | 64.2 | |
| S16 | spherical | infinite | 0.5429 | | | |
| S17 | spherical | infinite | | | | |

As may be obtained from Table 34, in Embodiment 12, the object-side surface and the image-side surface of any lens among the first to seventh lenses E1-E7 are both aspheric surfaces. Table 35 shows the high-order coefficients applicable to each aspheric surface in Embodiment 12. The surface type of each aspheric surface may be defined by the formula (1) given in Embodiment 1.

Figure 24A:
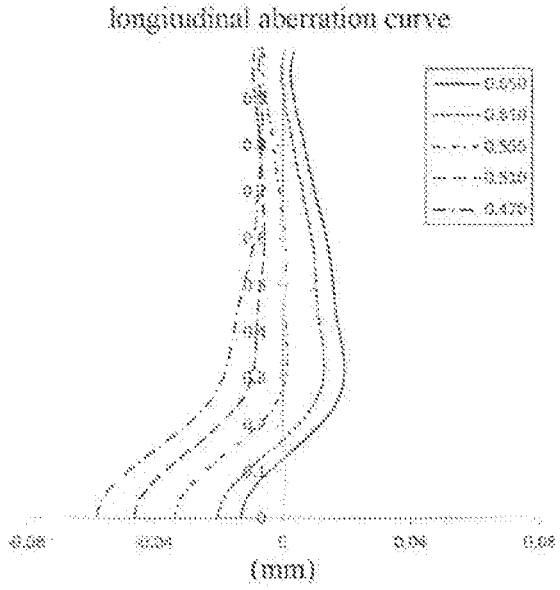
FIGS. 24A-24D respectively illustrate a longitudinal aberration curve, an astigmatic curve, a distortion curve, and a lateral color curve of the optical imaging lens assembly according to Embodiment 12.
Figure 24B:
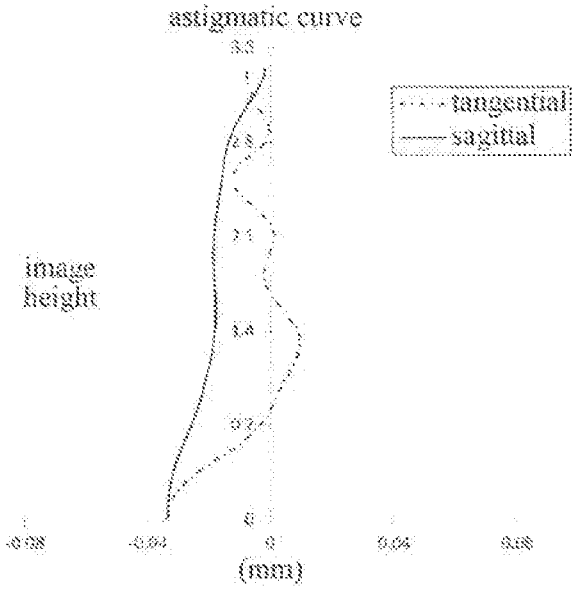

FIG. 24A illustrates the longitudinal aberration curve of the optical imaging lens assembly according to Embodiment 12, representing deviations of focal points of light of different wavelengths converged after passing through the lens assembly. FIG. 24B illustrates the astigmatic curve of the optical imaging lens assembly according to Embodiment 12,

TABLE 35

| surface number | A4 | A6 | A8 | A10 | A12 | A14 | A16 | A18 | A20 |
|---|---|---|---|---|---|---|---|---|---|
| S1 | −1.4420E−02 | 5.8328E−02 | −2.2036E−01 | 4.6401E−01 | −6.2591E−01 | 5.2639E−01 | −2.7046E−01 | 7.6127E−02 | −8.8700E−03 |
| S2 | −6.3200E−02 | 1.0365E−02 | 1.0113E−01 | −3.3138E−01 | 5.6127E−01 | −5.8938E−01 | 3.7619E−01 | −1.3319E−01 | 2.0041E−02 |
| S3 | −1.3583E−01 | 1.8423E−01 | −3.9722E−01 | 1.5816E+00 | −3.9708E+00 | 5.9412E+00 | −5.2412E+00 | 2.5294E+00 | −5.1357E−01 |
| S4 | −7.9920E−02 | −3.6300E−03 | 8.8641E−01 | −4.3594E+00 | 1.3594E+01 | −2.7436E+01 | 3.4222E+01 | −2.3885E+01 | 7.1622E+00 |
| S5 | −7.7760E−02 | 1.3463E−01 | −1.1467E+00 | 4.5245E+00 | −1.1454E+01 | 1.8127E+01 | −1.7135E+01 | 8.6299E+00 | −1.6539E+00 |
| S6 | −2.4825E−01 | 5.5658E−01 | −2.5078E+00 | 7.0824E+00 | −1.3517E+01 | 1.6976E+01 | −1.3167E+01 | 5.6618E+00 | −1.0329E+00 |
| S7 | −3.1361E−01 | 7.0620E−01 | −2.7089E+00 | 7.0846E+00 | −1.2641E+01 | 1.5041E+01 | −1.1275E+01 | 4.8087E+00 | −9.1042E−01 |
| S8 | −1.7584E−01 | 1.5842E−01 | −7.0100E−03 | −7.5617E−01 | 1.9530E+00 | −2.6181E+00 | 2.0132E+00 | −8.4612E−01 | 1.5239E−01 |
| S9 | −1.7130E−01 | 1.4790E−01 | 3.4917E−02 | −4.1790E−01 | 5.6992E−01 | −3.63371E−01 | 6.7390E−02 | 4.1375E−02 | −1.6240E−02 |
| S10 | −1.9690E−01 | 1.1871E−01 | −7.6880E−02 | 1.2201E−01 | −2.5342E−01 | 2.6379E−01 | −1.2553E−01 | 2.4995E−02 | −1.2500E−03 |
| S11 | −3.3320E−02 | −1.6708E−01 | 2.8210E−01 | −2.9849E−01 | 1.7105E−01 | −6.2290E−02 | 2.0035E−02 | −5.9200E−03 | 9.1100E−04 |
| S12 | −5.3000E−03 | −7.0400E−02 | 1.4942E−01 | −1.5643E−01 | 9.0951E−02 | −2.9930E−02 | 5.4000E−03 | −4.7000E−04 | 1.2800E−05 |
| S13 | −3.0506E−01 | 3.1576E−01 | −2.6300E−01 | 1.8255E−01 | −8.3170E−02 | 2.3271E−02 | −3.8800E−03 | 3.5600E−04 | −1.4000E−05 |
| S14 | −1.5689E−01 | 1.2924E−01 | −7.995013−02 | 3.3529E−02 | −9.2200E−03 | 1.5290E−03 | −1.3000E−04 | 1.8700E−06 | 2.8900E−07 |

Table 36 shows the effective focal lengths f1-f7 of the respective lenses in Embodiment 12, the total effective focal length f of the optical imaging lens assembly, the total track length TTL of the optical imaging lens assembly, and the half of the diagonal length ImgH of the effective pixel area on the image plane S17 of the optical imaging lens assembly.

TABLE 36

Figure 24C:
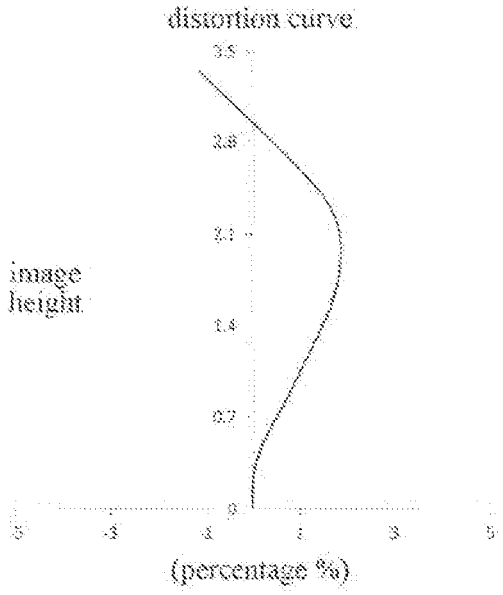
Figure 24D:
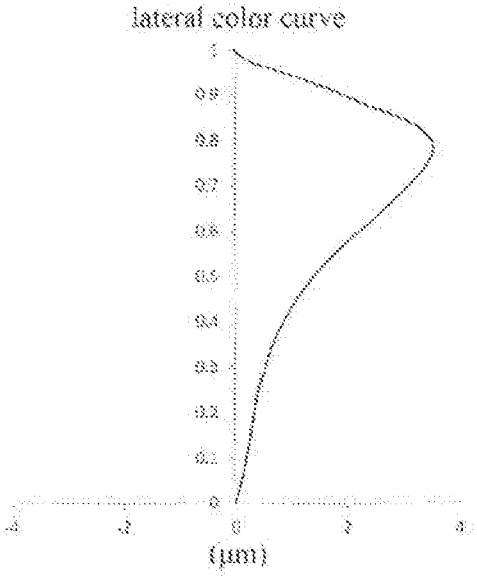

| | | | |
|---|---|---|---|
| f1(mm) | 3.96 | f(mm) | 3.91 |
| f2(mm) | −14.51 | TTL(mm) | 4.70 |
| f3(mm) | 24.88 | ImgH(mtn) | 3.35 |
| f4(mm) | 56.90 | | |
| f5(mm) | −48.92 | | |
| f6(mm) | 2.73 | | |
| f7(mm) | −1.90 | | |

representing a curvature of the tangential image plane and a curvature of the sagittal image plane. FIG. 24C illustrates the distortion curve of the optical imaging lens assembly according to Embodiment 12, representing amounts of distortion at different viewing angles. FIG. 24D illustrates the lateral color curve of the optical imaging lens assembly according to Embodiment 12, representing deviations of different image heights on the image plane after light passes through the lens assembly. It can be seen from FIGS. 24A-24D that the optical imaging lens assembly according to Embodiment 12 can achieve a good imaging quality.

To sum up, Embodiments 1-12 respectively satisfy the relationships shown in Table 37 below.

TABLE 37

| Conditional Expression | Embodiment 1 | 2 | 3 | 4 | 5 | 6 | 7 | 8 | 9 | 10 | 11 | 12 |
|---|---|---|---|---|---|---|---|---|---|---|---|---|
| f/EPD | 1.58 | 1.60 | 1.61 | 1.65 | 1.69 | 1.62 | 1.67 | 1.74 | 1.74 | 1.75 | 1.76 | 1.75 |
| \|f12/f34\| | 0.06 | 0.18 | 0.19 | 0.20 | 0.20 | 0.19 | 0.20 | 0.16 | 0.12 | 0.12 | 0.24 | 0.28 |
| f2/f7 | 4.94 | 8.49 | 8.47 | 8.31 | 7.75 | 7.93 | 8.18 | 10.02 | 8.03 | 7.59 | 7.86 | 7.66 |
| R1/R4 | 0.63 | 0.48 | 0.46 | 0.48 | 0.48 | 0.44 | 0.47 | 0.40 | 0.41 | 0.47 | 0.47 | 0.48 |
| R12/R14 | −0.88 | −0.98 | −1.02 | −1.01 | −1.02 | −1.07 | −1.02 | −1.07 | −1.05 | −1.05 | −1.06 | −1.08 |
| TTL/ImgH | 1.48 | 1.44 | 1.44 | 1.44 | 1.43 | 1.44 | 1.42 | 1.40 | 1.40 | 1.41 | 1.41 | 1.40 |
| f/f7 | −1.99 | −2.02 | −2.01 | −2.01 | −2.04 | −2.03 | −2.01 | −1.98 | −2.00 | −2.01 | −2.07 | −2.06 |
| CT6 (mm) | 0.61 | 0.50 | 0.49 | 0.52 | 0.49 | 0.49 | 0.49 | 0.47 | 0.46 | 0.47 | 0.50 | 0.50 |
| f1/R1 | 2.20 | 2.45 | 2.51 | 2.37 | 2.42 | 2.55 | 2.44 | 2.35 | 2.29 | 2.40 | 2.42 | 2.42 |
| CT1/f2 | −0.08 | −0.05 | −0.05 | −0.05 | −0.05 | −0.05 | −0.05 | −0.04 | −0.04 | −0.05 | −0.05 | −0.05 |
| f6/f7 | −1.08 | −1.37 | −1.37 | −1.40 | −1.39 | −1.38 | −1.39 | −1.42 | −1.41 | −1.41 | −1.43 | −1.44 |
| f7/R14 | −1.28 | −1.14 | −1.17 | −1.15 | −1.16 | −1.20 | −1.16 | −1.19 | −1.18 | −1.18 | −1.19 | −1.19 |
| f6/f3 | 0.38 | 0.23 | 0.24 | 0.24 | 0.27 | 0.11 | 0.27 | 0.21 | 0.22 | 0.26 | 0.20 | 0.11 |

The present disclosure further provides an imaging device having a photosensitive element which may be a photosensitive charge-coupled device (CCD) or complementary metal-oxide semiconductor (CMOS) element. The imaging device may be an independent imaging device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly comprising, sequentially from an object side to an image side along an optical axis, a first lens, a second lens, a third lens, a fourth lens, a fifth lens, a sixth lens, and a seventh lens, wherein the first lens has a positive refractive power, an object-side surface of the first lens is a convex surface, and an image-side surface of the first lens is a [convex] *concave* surface;

the second lens has a negative refractive power;

the third lens has a positive refractive power;

each of the fourth lens and the fifth lens has a positive refractive power or a negative refractive power;

the sixth lens has a positive refractive power;

the seventh lens has a negative refractive power, and an object-side surface and an image-side surface of the seventh lens are concave surfaces; and a combined focal length f12 of the first lens and the second lens and a combined focal length f34 of the third lens and the fourth lens satisfy: $|f12/f34| \leq 0.3$, wherein an effective focal length f2 of the second lens and an effective focal length f7 of the seventh lens satisfy: $4.5 < f2/f7 < 11.0$, *and*

*wherein a radius of curvature R1 of the object-side surface of the first lens and a radius of curvature R4 of an image-side surface of the second lens satisfy: $0 < R1/R4 < 1$.*

2. The optical imaging lens assembly according to claim 1, wherein a total effective focal length f of the optical imaging lens assembly and an entrance pupil diameter EPD of the optical imaging lens assembly satisfy: $f/EPD \leq 1.80$.

3. The optical imaging lens assembly according to claim 1, wherein a total effective focal length f of the optical imaging lens assembly and an effective focal length f7 of the seventh lens satisfy: $-2.5 < f/f7 < -1.5$.

4. The optical imaging lens assembly according to claim 3, wherein an effective focal length f6 of the sixth lens and the effective focal length f7 of the seventh lens satisfy: $-1.5 < f6/f7 < -1.0$.

5. The optical imaging lens assembly according to claim 3, wherein an effective focal length f7 of the seventh lens and a radius of curvature R14 of the image-side surface of the seventh lens satisfy: $-1.5 < f7/R14 < -1.0$.

6. The optical imaging lens assembly according to claim 1, wherein an effective focal length f1 of the first lens and a radius of curvature R1 of the object-side surface of the first lens satisfy: $2.0 < f1/R1 < 3.0$.

7. The optical imaging lens assembly according to claim 1, wherein a center thickness CT1 of the first lens on the optical axis and an effective focal length f2 of the second lens satisfy: $-0.2 < CT1/f2 < 0$.

8. The optical imaging lens assembly according to claim 1, wherein an effective focal length f6 of the sixth lens and an effective focal length f3 of the third lens satisfy: $0 < f6/f3 < 0.5$.

[9. The optical imaging lens assembly according to claim 1, wherein a radius of curvature R1 of the object-side surface of the first lens and a radius of curvature R4 of an image-side surface of the second lens satisfy: $0 < R1/R4 < 1$.]

10. The optical imaging lens assembly according to claim 1, wherein a radius of curvature R12 of an image-side surface of the sixth lens and a radius of curvature R14 of the image-side surface of the seventh lens satisfy: $-1.5 < R12/R14 < -0.5$.

11. The optical imaging lens assembly according to claim 1, wherein a center thickness CT6 of the sixth lens on the optical axis satisfies: 0.3 mm<CT6<0.8 mm.

12. The optical imaging lens assembly according to claim 11, wherein a total track length TTL of the optical imaging lens assembly and half of a diagonal length ImgH of an effective pixel area on an image plane of the optical imaging lens assembly satisfy: $TTL/ImgH \leq 1.50$.

*13. The optical imaging lens assembly according to claim 1, wherein the effective focal length f2 of the second lens and the effective focal length f7 of the seventh lens satisfy: $7.59 \leq f2/f7 < 11.0$.*

*14. The optical imaging lens assembly according to claim 1, wherein the effective focal length f2 of the second lens and the effective focal length f7 of the seventh lens satisfy: $7.59 \leq f2/f7 \leq 10.02$.*

*15. The optical imaging lens assembly according to claim 1, wherein a total effective focal length f of the optical imaging lens assembly and the effective focal length f7 of the seventh lens satisfy: $-2.1 < f/f7 < -1.8$.*

*16. The optical imaging lens assembly according to claim 1, wherein an effective focal length f6 of the sixth lens and the effective focal length f7 of the seventh lens satisfy: $-1.44 \leq f6/f7 \leq -1.08$.*

*17. The optical imaging lens assembly according to claim 1, wherein the effective focal length f7 of the seventh lens and a radius of curvature R14 of the image-side surface of the seventh lens satisfy: $-1.3 < f7/R14 < -1.1$.*

*18. The optical imaging lens assembly according to claim 1, wherein a total effective focal length f of the optical imaging lens assembly and an entrance pupil diameter EPD of the optical imaging lens assembly satisfy: $f/EPD \leq 1.76$.*

*19. The optical imaging lens assembly according to claim 1, wherein the combined focal length f12 of the first lens and the second lens and the combined focal length f34 of the third lens and the fourth lens satisfy: $|f12/f34| \leq 0.28$.*

* * * * *